(12) United States Patent
Vero et al.

(10) Patent No.: US 7,763,666 B2
(45) Date of Patent: Jul. 27, 2010

(54) PLUG-FLOW REGENERATION PROCESS

(75) Inventors: Gregory Mark Vero, Camberwell (AU); Paul Smith, Denver, CO (US)

(73) Assignee: Orica Australia Pty Ltd., Melbourne (AU)

( * ) Notice: Subject to any disclaimer, the term of this patent is extended or adjusted under 35 U.S.C. 154(b) by 704 days.

(21) Appl. No.: 11/572,905

(22) PCT Filed: Jul. 28, 2005

(86) PCT No.: PCT/AU2005/001111

§ 371 (c)(1),
(2), (4) Date: Jun. 22, 2007

(87) PCT Pub. No.: WO2006/010216

PCT Pub. Date: Feb. 2, 2006

(65) Prior Publication Data

US 2008/0021124 A1    Jan. 24, 2008

Related U.S. Application Data

(60) Provisional application No. 60/683,571, filed on May 23, 2005.

(30) Foreign Application Priority Data

Jul. 28, 2004    (AU) .............................. 2004904207

(51) Int. Cl.
    *C08J 5/20* (2006.01)
(52) U.S. Cl. ....................................................... 521/26
(58) Field of Classification Search .................... 521/26
    See application file for complete search history.

(56) References Cited

U.S. PATENT DOCUMENTS

| | | | |
|---|---|---|---|
| 1,190,863 A | 7/1916 | Corne et al. | |
| 2,642,514 A | 6/1953 | Herkenhoff | |
| 2,697,724 A | 12/1954 | Collier | |
| 3,560,378 A | 2/1971 | Weiss et al. | |
| 3,808,305 A | 4/1974 | Gregor | |
| 3,996,131 A | 12/1976 | Conn | |
| 4,028,237 A | 6/1977 | Nishimura et al. | |
| 4,049,546 A | 9/1977 | Rock | |
| 4,123,396 A | 10/1978 | Rembaum et al. | |
| 4,154,675 A | 5/1979 | Jowett et al. | |
| 4,207,397 A | 6/1980 | Davis et al. | |
| 4,269,760 A | 5/1981 | Wakimoto et al. | |
| 4,279,755 A | 7/1981 | Himsley | |
| 4,289,617 A | 9/1981 | Davis | |
| 4,303,531 A | 12/1981 | Kawabata et al. | |
| 4,312,956 A | 1/1982 | Chong et al. | |
| 4,314,905 A | 2/1982 | Etzel et al. | |
| 4,329,225 A | 5/1982 | Davis et al. | |
| 4,447,475 A | 5/1984 | Lubbock et al. | |
| 4,473,474 A | 9/1984 | Ostreicher et al. | |
| 4,537,683 A | 8/1985 | Isacoff et al. | |
| 4,632,745 A | 12/1986 | Giuffrida et al. | |
| 4,648,976 A | 3/1987 | Chen | |
| 4,670,154 A | 6/1987 | Carlson et al. | |
| 4,673,504 A | 6/1987 | Ostreicher et al. | |
| 4,693,832 A | 9/1987 | Hurst | |
| 4,702,840 A | 10/1987 | Degen et al. | |
| 4,724,082 A | 2/1988 | Boom | |
| 4,734,200 A | 3/1988 | Berry | |
| 4,737,921 A | 4/1988 | Goldwasser et al. | |
| 4,804,465 A | 2/1989 | Brown | |
| 4,806,244 A | 2/1989 | Guilhem | |
| 4,808,316 A | 2/1989 | Otomura et al. | |
| 4,828,715 A | 5/1989 | Sander | |
| 4,839,057 A | 6/1989 | White | |
| 4,935,450 A | 6/1990 | Cone, Jr. | |
| 4,952,386 A | 8/1990 | Davison et al. | |
| 4,956,061 A | 9/1990 | Dempsey et al. | |
| 5,043,072 A | 8/1991 | Hitotsuyanagi et al. | |
| 5,120,688 A | 6/1992 | Hsieh | |

(Continued)

FOREIGN PATENT DOCUMENTS

| | | |
|---|---|---|
| AU | 52709/79 | 6/1980 |
| AU | 60530/80 | 11/1980 |
| AU | 704376 | 4/1999 |
| AU | 705434 | 5/1999 |
| AU | 744706 | 2/2002 |
| AU | 749656 | 6/2002 |
| DE | 39 38 245 | 5/1991 |
| EP | 0 117 096 | 8/1984 |
| EP | 0 522 856 | 1/1993 |
| EP | 0 540 485 | 5/1996 |

(Continued)

OTHER PUBLICATIONS

Lange, R. et al., "Design and Constructions of the World's First Large Scale MIEX Water Treatment Plant," 2001.

(Continued)

*Primary Examiner*—Edward J Cain
(74) *Attorney, Agent, or Firm*—Greenlee, Winner and Sullivan, P.C.

(57) ABSTRACT

A process for the regeneration of loaded ion-exchange resin comprising (a) providing loaded resin for regeneration; (b) providing first stage and third stage regenerant suitable for regenerating loaded resin; (c) providing a plurality of regeneration vessels; (d) filling a regeneration vessel with a desired amount of the loaded resin before filling another regeneration vessel; (e) once a regeneration vessel has been filled, contacting the loaded resin within the vessel with first stage regenerant in a plug flow to provide a first stage regenerated resin; (f) contacting the first stage regenerated resin with third stage regenerant in a plug flow to provide regenerated resin and (g) removing and collecting third stage regenerant from a vessel containing regenerated resin and adding the collected regenerant to the first stage regenerant.

65 Claims, 18 Drawing Sheets

U.S. PATENT DOCUMENTS

| | | |
|---|---|---|
| 5,128,041 A | 7/1992 | Degen et al. |
| 5,143,583 A | 9/1992 | Marchessault et al. |
| 5,149,437 A | 9/1992 | Wilkinson et al. |
| 5,152,896 A | 10/1992 | Mazet et al. |
| 5,182,023 A | 1/1993 | O'Connor et al. |
| 5,215,632 A | 6/1993 | Fritts et al. |
| 5,236,595 A | 8/1993 | Wang et al. |
| 5,248,424 A | 9/1993 | Cote et al. |
| 5,254,257 A | 10/1993 | Brigano et al. |
| 5,320,756 A | 6/1994 | Winston |
| 5,364,534 A | 11/1994 | Anselme et al. |
| 5,403,495 A | 4/1995 | Kust et al. |
| 5,449,522 A | 9/1995 | Hill |
| 5,464,530 A | 11/1995 | Stivers |
| 5,494,582 A | 2/1996 | Goodman |
| 5,547,585 A | 8/1996 | Shepherd et al. |
| 5,565,748 A | 10/1996 | Takizawa et al. |
| 5,595,666 A | 1/1997 | Kochen et al. |
| 5,639,377 A | 6/1997 | Banham et al. |
| 5,707,514 A | 1/1998 | Yamasaki et al. |
| 5,728,302 A | 3/1998 | Connor et al. |
| 5,772,891 A | 6/1998 | Yamasaki et al. |
| 5,855,790 A | 1/1999 | Bradbury et al. |
| 5,876,685 A | 3/1999 | Krulik et al. |
| 5,900,146 A | 5/1999 | Ballard et al. |
| 5,932,099 A | 8/1999 | Cote et al. |
| 6,020,210 A | 2/2000 | Miltenyi |
| 6,027,649 A | 2/2000 | Benedek et al. |
| 6,045,694 A | 4/2000 | Wang et al. |
| 6,110,375 A | 8/2000 | Bacchus et al. |
| 6,120,688 A | 9/2000 | Daly et al. |
| 6,143,717 A | 11/2000 | Hill |
| 6,171,487 B1 | 1/2001 | Rousseau et al. |
| 6,171,489 B1 | 1/2001 | Ballard et al. |
| 6,197,193 B1 | 3/2001 | Archer |
| 6,200,471 B1 | 3/2001 | Nohren |
| 6,203,705 B1 | 3/2001 | James et al. |
| 6,267,892 B1 | 7/2001 | Wada et al. |
| 6,338,803 B1 | 1/2002 | Campbell et al. |
| 6,355,221 B1 | 3/2002 | Rappas |
| 6,372,143 B1 | 4/2002 | Bradley |
| 6,375,848 B1 | 4/2002 | Cote et al. |
| 6,416,668 B1 | 7/2002 | Al-Samadi |
| 6,436,297 B1 | 8/2002 | Lebeau et al. |
| 6,461,514 B1 | 10/2002 | Al-Samadi |
| 6,464,881 B2 | 10/2002 | Thoraval |
| 6,491,827 B1 | 12/2002 | Temple et al. |
| 6,517,723 B1 | 2/2003 | Daigger et al. |
| 6,590,094 B2 | 7/2003 | Karlou-Eyrisch et al. |
| 6,613,232 B2 | 9/2003 | Chesner et al. |
| 6,669,849 B1 | 12/2003 | Nguyen et al. |
| 6,776,913 B1 | 8/2004 | Jangbarwala |
| 6,777,454 B2 | 8/2004 | Ritchie et al. |
| 6,783,681 B2 | 8/2004 | Mueller et al. |
| 6,824,685 B2 | 11/2004 | Katsu et al. |
| 6,864,397 B2 | 3/2005 | Kondo et al. |
| 6,926,832 B2 | 8/2005 | Collins et al. |
| 6,954,738 B2 | 10/2005 | Wang et al. |
| 6,982,037 B2 | 1/2006 | Horng et al. |
| 6,998,054 B2 | 2/2006 | Jangbarwala et al. |
| 7,025,884 B2 | 4/2006 | Mueller et al. |
| 2004/0050785 A1 | 3/2004 | Nguyen et al. |
| 2004/0140266 A1 | 7/2004 | Nguyen et al. |
| 2005/0124707 A1 | 6/2005 | Eldridge et al. |
| 2005/0224413 A1 | 10/2005 | Nguyen et al. |
| 2005/0237593 A1 | 10/2005 | Xu et al. |
| 2005/0274674 A1 | 12/2005 | Mueller et al. |
| 2006/0011550 A1 | 1/2006 | Bourke et al. |

FOREIGN PATENT DOCUMENTS

| | | |
|---|---|---|
| EP | 0 605 826 | 8/1997 |
| EP | 0 779 899 | 2/2000 |
| EP | 0 781 255 | 7/2000 |
| EP | 1 431 248 A2 | 6/2004 |
| EP | 1 431 248 A3 | 6/2005 |
| GB | 1 559 809 | 1/1980 |
| GB | 2 060 430 | 5/1981 |
| GB | 2 273 701 | 6/1994 |
| JP | 59-49851 | 3/1984 |
| JP | 60-132609 A | 7/1985 |
| JP | 62141071 | 6/1987 |
| JP | 6-102709 | 4/1994 |
| JP | 09-047761 | 2/1997 |
| JP | 11-309354 | 11/1999 |
| WO | WO 93/21114 | 10/1993 |
| WO | WO 94/00237 | 1/1994 |
| WO | WO 96/07615 | 3/1996 |
| WO | WO 96/07675 | 3/1996 |
| WO | WO 98/51622 | 11/1998 |
| WO | WO 99/47456 | 9/1999 |
| WO | WO 02/04555 | 1/2002 |
| WO | WO 02/44091 | 6/2002 |
| WO | WO 03/057739 | 7/2003 |
| WO | WO 03/082748 | 10/2003 |
| WO | WO 04/087586 | 10/2004 |
| WO | WO 04/098776 | 11/2004 |
| WO | WO 04/101148 | 11/2004 |
| WO | WO2005/105677 | 11/2005 |
| WO | WO2006/029478 | 3/2006 |

OTHER PUBLICATIONS

AMIAD Turbocelan Filters, http://www.amiadusa.com, Non dated.

Amy et al. (1999) "Interactions Between Natural Organic Matter (NOM) and Membranes: Rejection and Fouling," *Water Sci Technol.* 40(9):131-139.

Ariza et al. (2002) "Effect of pH on Electrokinetic and Electrochemical Parameter of Both Sub-Layers of Composite Polyamide/Polysulfone Membranes," *Desalination* 148:377-382.

Bolto et al. (1985) "Continuous Ion Exchange Using Magnetic Micro-Resins — the Continuous Sirotherm Desalination Demonstration Plant," *AWWW 1985 Int. Conf. Proc.* :282-288.

Bourke et al. (Apr. 1999) "Scale-up of the MIEX DOC Process for Full Scale Water Treatment Plants," Water Corporation of WA., 18th Federal Convention, Australian Water, and Wastewater Association, Proceedings 11-14, Adelaide Australia.

Brattebo et al. (1987) "Ion Exchange for the Removal of Humic Acids in Water Treatment," *Wat. Res.* 21(9):1045-1052.

Brown et al. (1974) "Anion Exchange Resin Performance in the Treatment of River Trent Water," *Effluent Water Treat. J.* 14:417-422.

Bursill et al. (1985) "The Effect of Natural Organics on Water Treatment," *AWWA 11th Federal Cony.* :197-204.

Chai et al. (1998) "Charged Polyacrylonitrile Membranes Having Amphiphilic Quaternized Ammonium Groups for Ultrafiltration," *Appl Poly. Sci.* 69(9):1821-1828.

Childress et al. (2000) "Relating Nanofiltration Membrane Performance to Membrane Charge (Electrokinetic) Characteristics," *Environ. Sci. Technol.* 34:3710-3716.

Cho et al. (2000) "Membrane Filtration of Natural Organic Matter: Comparison of Flux Decline, NOM Rejection, and Foulants During Filtration with Three UF Membranes," *Desalination* 127:283-298.

Cho et al. (2000) "Membrane Filtration of Natural Organic Matter: Factors and Mechanisms Affecting Rejection and Flux Decline with Charged Ultra Filtration (UF)," *J. Memb. Sci.* 164:89-110.

Cho et al. (1998) "Characterization of Clean and Natural Organic Matter (Nom) Fouled NF and UF Membranes, and Foulants Characterization," *Desalination* 118:101-108.

Christy et al. (2002) "High-Performance Tangential Flow Filtration: A Highly Selective Membrane Separation Process," *Desalination* 144:133-136.

Chriswell et al. (1977) "Comparison of Macroreticular Resin and Activated Carbon as Sorbents," *J. AWWW* Dec. :669-674.

Derwent Abstract Accession No. 86-281075/43, JP 61-204080A, Tokuyama Soda KK, Sep. 10, 1986.

Derwent Abstract Accession No. 92-288534/35, JP 04-197435, Sumitomo Chem. Co Ltd, Jul. 17, 1992.

Derwent Abstract Accession No. 91-255202/35, HU To56-044-A, Villamosenergiaipari Ki, Jul. 29, 1991.

Drikas et al. (Non dated) "Operating the Miex Process With Microfiltration of Coagulation,".

Drikas et al. (2002) "Removal of Natural Organic Matter — A Fresh Approach," *Water Sci. Technol.* 2(1):71-79.

Eldridge, R.J. (1995) "Moving-Bed Ion Exchange with Magnetic Resins," *Rev. Chem. Eng.* 11(3):185-228.

Feed Materials Production Center (Non dated) "Potential Exposure Pathways," http://www.atsdr.cdc.gov/HAC/PHA/fer/fer_p2d.html.

Fu et al. (1989) "Mechanistic Interactions of Aquatic Organic Substances with Anion- Exchange Resins," *Aquatic Humic Resources, Am. Chem. Soc.* :797-811.

Galjaard et al. (2005) "Influence of NOM and Membrane Surface Charge on UF- Membrane Fouling," http://www.iwaponline.com/wio/2005/04/wio200504001.htm.

Galjaard et al. (2002) "Enhanced Pre-Coat Engineering (EPCE) for MF and UF: Steps to Full-Scale Application," *Proc. IWA*, ISSSN 0941-0961.

Hach Webpage (Downloaded Jan. 5, 2006) Browse by Parameter, Test for: copper, http://www.hach.corn.

Hach webpage (Downloaded Jan. 5, 2006) Dr/4000 Procedure, Methods8506 and Method 8026, http://www.hach.com.

Harries et al. (1984) "Anion Exchange in High Flow Rate Mixed Beds," *Effluent Water Treatment J.* 24:131-139.

Hongve, D. (1989) "Anion Exchange for Removal of Humus from Drinking Water. Calcium Improves the Efficiency of the Process," *Water Res.* 23(11):1451-1454.

Kaiya et al. (2000) "Analysis of Organic Matter Causing Membrane Fouling in Drinking Water Treatment," *Water Sci. Technol.* 41(10-11):59-67.

Kavitskaya et al. (2003) "Adsorption of Anionic Surface Active Substances(SAS) on Charged Membranes," *Desalination* 158:225-230.

Kim et al. (Dec. 1991) "Using Anion Exchange Resins to Remove Thm Precursors," Research and Technology *J. AWWA* 83:61-68.

Kim et al. (2003) "Evaluation of UF Membranes for Effective Effluent Organic Matter (EfOM) Removal with Hydrophilic Polymer Additives," *AWWA Membrane Technology Conference*.

Kunin et al. (1980) "Removal of Humic Material from Drinking Water by Anion Exchange Resins," *Activated Carbon Absorption of Organics from the Aqueous Phase*, vol. 2, Ann Arbor Science, Ann Arbor, pp. 425-441.

Laine et al. (2002) "Understanding Membrane Fouling: A Review of Over a Decade of Research," *Proc. IWA*, ISSN 0941-0961.

Lee et al. (2002) "Determination of Mass Transport Characteristics for Natural Organic Matter (NOM) in Ultrafiltration (UF) and Nanofiltration (NF) Membranes," *Water Sci and Technol.* 2(2):151-160.

Lee et al. (2001) "Cleaning Strategies for Flux Recovery of an Ultra Filtration Membrane Fouled by Natural Organic Matter," *Water. Resources* 35(14):3301-3308.

MIEX DOC US Technical Brochure, Downloaded Jan. 5, 2006, http://www.miexresin.com.

Morran et al. (non dated) "Miex and Microfiltration — A Winning Alliance,".

Morran et al. (1996) "A New Technique for the Removal of Natural Organic Matter," *AWWA Watertec Convention*, Sydney.

Morran et al. (Mar. 1997) "A Simple Method to Reduce Disinfection By-Product Formation," 17th Federal Convention, Australian Water and Wastewater Convention, Proceedings 16-21, Melbourne Australia, pp:373-379.

Mysels, K.J. (1959) *Introduction to Colloid Chemistry*, Interscience Publishers, New York, pp. 345.

Naumczyk et al. (1989) "Organics Isolation from Fresh Drinking Waters by Macroporous Anion-Exchange Resins," *Water Res.* 23(12):1593-1597.

Nguyen et al. (Mar. 1997) "DOC Removal by Miex Process, Scaling-up and Other Development Issues," 17th Federal Convention, Australian Wastewater Association, Proceedings 16-21, Melbourne Australia, pp. 373-379.

Odegaard et al. (1989) "Removal of Humic Substances by Ion Exchange," *Aquatic Humic Resources, Am. Chem. Soc.* :813-834.

Rook et al. (1979) "Removal of Trihalomethane Precursors from Surface Waters Using Weal Base Resins," *Water Technol. Quality J.* :520-524.

Shim et al. (2002) "Effects of Natural Organic Matter and Ionic Strength on Membrane Surface Charge," *J. Environmental Sci Technol.* 366(17):3864-3871.

Slunjski et al. (Apr. 1999) "MIEX DOC Process — A New Ion Exchange Process," Australian Water Quality Centre, 18th Federal Convention, Australian Water and Wastewater Association, Proceedings 11-14, Adelaide Australia.

Stone et al. (1993) "Charged Micropourous Membranes," *Microelectronics Applications Notes*.

Swinton et al. (1983) "Continuous Ion Exchange Using Magnetic Microbeads — Field Trials of a Transportable Pilot Plant," *AWWW* 10th Federal Convention 30-1-30-14.

Symons et al. (1992) "The Use of Anion Exchange Resins for the Removal of Natural Organic Matter from Municipal Water," *International Water Conference Water Conference, Proceedings Book* :92-120.

Thurman et al. (1989) "Separation of Humic Substances and Anionic Surfactants from Ground Water by Selective Absorption," *Aquatic Humic Substances: Influence on Fate and Transformation of Pollutants*, American Chemical Society :107-114.

Tilsley et al. (1978) "Ion Exchange in the Water Industry — Interaction of Organic Matter with Anion Resins," *Chem. Industry* :142-149.

van Breemen et al. (1979) "The Fate of Fluvic Acids During Water Treatment," *Wat. Res.* 13:771-779.

Wlimelech et al. (1996) Water treatment Technology Program Report No. 10, December, U.S. Department of the Interior, Bureau of Reclamation.

Xenopoulos et al. (2003) Abstract from the Meeting of the North American Membrane Society, Biomedical Applications/ Bioseparations section of May 19, 2003, http://www.che.utoledo.edu/nams/2003/viewpaper.cfm?ID=426, accessed May 28, 2004.

1
0.0BV 2
0.2BV 3
0.4BV 4
0.6BV 5
0.7 BV 6
0.8BV 7
0.9BV 8
1.0 BV 9
1.1 BV 10
1.2 BV 11
0.0 BV 12
0.2 BV 13
0.4 BV 14
0.6 BV 15
0.7 BV 16
0.8 BV 17
0.9 BV

PLUG-FLOW REGENERATION PROCESS

CROSS-REFERENCE TO RELATED APPLICATIONS

This application is a National Stage Application of PCT International Application No. PCT/AU2005/001111, filed on Jul. 28, 2005, which claims benefit of U.S. Application No. 60/683,571, filed on May 23, 2005, and Australian Patent Application No. 2004/904207, filed Jul. 28, 2004, both of which are incorporated herein by reference in their entirety to the extent not inconsistent with the disclosure hereof.

FIELD OF THE INVENTION

The present invention relates to water treatment, and in particular to water treatment processes which involve the use of ion-exchange resins. The invention relates to a process for regenerating ion-exchange resin used in such processes.

For convenience, the invention will be described with reference to the treatment of raw water to produce potable water for distribution and consumption, however it is to be understood that the invention may also be used in other industrial applications, such as in processes for the treatment of sewage and effluent from industrial processes.

BACKGROUND OF THE INVENTION

The processes used in water treatment depend largely on the nature of the raw water. Water supplies which feed industrial plants for the production of potable water for distribution and consumption often contain unacceptably high levels of dissolved, dispersed or suspended organic compounds and materials. Most organic compounds and materials found in raw water supplies are natural organic matter ("NOM"). A fraction of the NOM in the raw water supply is represented by dissolved organic compounds which present particular difficulties. These organic compounds referred to as dissolved organic carbon ("DOC") are one of the main causes of water discolouration. DOC often includes compounds such as humic and fulvic acids which are water soluble at certain water pH levels. Humic and fulvic acids are not discrete organic compounds but mixtures of organic compounds formed by the degradation of plant residues.

The removal of DOC from water and especially the humic and fulvic acids is necessary to provide high quality water suitable for distribution and consumption. A majority of the compounds and materials which constitute DOC are soluble and not readily separable from the water. The DOC present in raw water renders conventional treatment difficult and expensive.

The production of safe potable water from a raw water supply often requires treatment of the raw water to make it commercially acceptable, as well as safe to drink. The removal of suspended matter and DOC is an important aspect of this treatment. Two approaches are commonly used for the removal of suspended matter and DOC. One involves coagulation and the other membrane filtration.

In the process involving coagulation, a coagulant is applied to destabilise and combine with suspended matter and DOC so that they coalesce and form a floc, which can then be physically removed by methods such as floating, settling, filtration or a combination thereof. Coagulants such as alum (aluminium sulphate), various iron salts and synthetic polymers are commonly used in processes for water treatment. However, many raw water sources have high levels of DOC present, which reacts with the coagulant requiring a higher coagulant dose than would be required for removal of suspended matter alone. The bulk of the floc formed may then be removed by sedimentation or flotation and the water containing the remainder of the floc passed through a filter for final clarification. However, even after such treatment, the treated water may contain as much as 30-70% of the initial DOC.

In the membrane filtration process the water is filtered through a membrane. There are four commonly available membrane processes currently in use for water treatment. Microfiltration ("MF") and Ultrafiltration ("UF") are two processes generally used to remove turbidity and solid particles from water. However, if the water contains high levels of DOC then the membranes used in MF and UF tend to be fouled by the DOC, thereby reducing the flux across the membrane, reducing the life of the membranes and increasing operating costs. The two other membrane processes, Nanofiltration ("NF") and Reverse Osmosis ("RO") are typically used to remove low molecular weight compounds from water, including DOC, to allow its use as potable water. These membrane systems are also used in desalination of seawater and brackish waters (e.g. demineralisation). These membrane systems are designed to handle water containing high levels of DOC but have much higher capital and operating costs than MF and UF when used in the production of potable water.

Ion-exchange resins can also be used for removing DOC present in raw water. Ion-exchange techniques conventionally involve passing water through a packed bed or column of ion-exchange resin. Target species such as DOC are removed by being adsorbed onto the ion-exchange resin. Ion-exchange resins have been used to remove up to 90% of the DOC in raw water.

Ion-exchange resins may also be used in conjunction with other methods of water purification including those mentioned previously. Sufficient resin may be added to remove a percentage of the DOC such that the cost of any subsequent treatment used to meet water quality objectives is minimised. For example, the use of ion-exchange resin for the removal of DOC can facilitate the reduction of the amount of coagulant required to achieve acceptable product water quality. Ion-exchange resin may also aid in significantly reducing the capital and operating costs of membrane filtration.

In order to minimise costs in water processing the ion-exchange resins should be recyclable and regenerable. Recyclable resins can be used multiple times without regeneration and continue to be effective in adsorbing DOC. Regenerable resins are capable of being treated to remove adsorbed DOC, and as such, these regenerated resins can be reintroduced into the treatment process.

Ion-exchange resins incorporating dispersed magnetic particles (magnetic ion-exchange resins) readily agglomerate due to the magnetic attractive forces between them. This property renders them particularly useful as recyclable resins as the agglomerated particles tend to settle quickly and are therefore more readily removable from the water. A particularly useful magnetic ion-exchange resin for the treatment of raw water is described in WO96/07675, the entire contents of which is incorporated herein by reference. The resin disclosed in this document has magnetic particles dispersed throughout the polymeric beads such that even when the resin become worn through repeated use, the worn resin retains the magnetic character. Ion exchange beads of the type disclosed in this document are available from Orica Australia Pty. Ltd., under the trademark, MIEX®. One of the benefits of using MIEX® resin is that its small size allows the resin to be pumped.

WO 96/07615, the entire contents of which is incorporated herein by reference, describes a process for removing DOC from water using an ion-exchange resin which can be recycled and regenerated. This process is particularly useful in treating raw water with magnetic ion-exchange resin of the type described in WO96/07675.

The preferred ion-exchange resins disclosed in WO96/07675 are magnetic ion-exchange resins which have, throughout their structure, cationic functional groups which provide suitable sites for the adsorption of DOC. These cationic functional groups possess negatively charged counterions which are capable of exchanging with the negatively charged DOC. The negatively charged DOC is removed from the raw water through exchange with the resin's negative counter ion. As a result of this process DOC becomes bound to the magnetic ion-exchange resin and the function of the ion-exchange resin is reduced. Such resins can be referred to as used, spent or loaded resins. When producing potable water for distribution and consumption it is particularly important to be able to regenerate the loaded resin in an efficient and cost-effective manner. This can also be important when using ion-exchange resins for other purposes such as removal of contaminants in potable or waste water treatment and metal recovery.

WO 96/07615 discloses a process for regenerating magnetic ion-exchange resin by contacting it with brine (which is substantially a NaCl solution). The brine solution in such a process is the "regenerant". The resin is regenerated by the exchange of a chloride ion for a DOC ion from the loaded resin. The byproduct from regeneration is referred to as the "spent regenerant" and is primarily a mixture of the removed DOC and brine. The spent regenerant from a regeneration process is discharged into the ocean or may be used as land fill.

The regeneration process disclosed in WO 96/07615 involves passing brine through a packed column of loaded resin. The regeneration can also be affected by a mixing or agitation process. In practice, these regeneration processes are performed in large batch wise operations. For example, loaded MIEX® resin is removed from the treatment process from the settler underflow and generally transferred to one of two large regeneration vessels. When one vessel is filled the settler underflow stream is directed to the second regeneration vessel while the one that has been filled undergoes regeneration. The regeneration is performed either in:

(i) a mixing tank where a mechanical agitator mixes the regenerant solution with the resin (agitated tank regeneration), or
(ii) a tank where the regenerant solution is passed through a stationary bed of resin with the ion exchange occurring while the regenerant is in contact with the resin (column regeneration or plug flow regeneration).

In contrast, fixed bed filtering systems retain the resin within large treatment vessels and the resin is regenerated by taking the treatment vessel offline and washing the loaded resin with a suitable regenerant to regenerate the resin.

Each step in the regeneration process (including rinsing steps if required) can take a long time to complete. Large regeneration tanks may need to be filed with resin and regenerant, then allowed time to regenerate the resin, then the regenerant needs to be drained and the resin washed before recycling the regenerated resin. Large qualities of regenerant, typically brine, are used and result in large quantities of spent regenerant containing the compounds such as DOC and other electrolytes that were bound to the ion exchange resin together with electrolytes ordinarily present in the regenerant. Large volumes are involved as the regenerant needs to be used in a dilute solution because ion exchange resins suffer from osmotic shock which damages the resin reducing its effectiveness. To avoid this saturated regenerant precursor solutions are normally diluted before use as regenerant and therefore increases the total volume of spent regenerant. The washing step also produces a waste stream containing dilute concentrations of electrolytes ordinarily present in the regenerant. The spent regenerant and wash waste stream may need to be collected, processed, treated or concentrated and removed by tanker for disposal. At many sites it is not environmentally acceptable to send large qualities of brine into the sewers/drain system. This increases the overall capital and maintenance costs due to the additional required equipment for managing the dilution of the regenerant precursor solution, pumps, storage vessels and associated sensors and other equipment.

It will also be appreciated that the treatment plant requires a large inventory of resin to cover both the resin in use in the water treatment process and also the resin being regenerated and spare resin to replace operating losses. This resin will need to be stored on site. This can create further difficulties when the plant is shut down for maintenance. All the resin needs to be stored in containment vessels whilst the water treatment tank is subjected to maintenance.

The additional systems required for on site regeneration of loaded resin are a significant problem and may prevent the use of resin systems at some water treatment sites. In addition to the storage requirements for regenerant and spent regenerant, the overall regeneration systems can have a large footprint as the amount of loaded resin which can be regenerated at any one time has traditionally been limited by the size of the regeneration containment vessel. Large vessels have a large footprint and the required space may not be available at the treatment plant, limiting the regeneration process to vessels of restricted sizes or requiring the loaded resin to be processed off site. Furthermore, the cost associated with manufacturing the large containment vessel(s) often require specialised design, engineering, manufacture and equipment which can also significantly increase the initial installation costs and time particularly when the customer has little expertise with on site resin regeneration.

Accordingly, there is a need for alternative ion-exchange regeneration processes, to assist in addressing one or more of the shortcomings of the currently available regeneration processes and thereby allow the increased use of resin systems such as those involving MIEX® resin.

BRIEF SUMMARY OF THE INVENTION

The present invention is based around the concept of regenerating smaller qualities of loaded resin using counter current and plug flow systems. Such a regeneration system can allow for the regeneration of a larger quantity of resin more quickly and with less waste than a comparative large scale batch system.

In an aspect of the present invention there is provided a process for the regeneration of loaded ion-exchange resin, such as resin loaded with dissolved organic carbon ("DOC"), the process comprising:

(a) providing loaded resin for regeneration;
(b) providing first stage and third stage regenerant suitable for regenerating loaded resin;
(c) providing a plurality of first stage regeneration vessels;
(d) providing at least one second stage regeneration vessel;
(e) providing a plurality of third stage vessels;
(f) filling a first stage regeneration vessel with a desired amount of the loaded resin before filling another first stage regeneration vessel;

(g) once a first stage regeneration vessel has been filled, contacting the loaded resin within the vessel with first stage regenerant in a plug flow to provide a first stage regenerated resin;

(h) transferring the first stage regenerated resin from first stage regeneration vessels into the second stage regeneration vessel and soaking the resin in first stage regenerant to provide second stage regenerated resin;

(i) filling a third stage vessel with a desired amount of the second stage regenerated resin before filling another third stage vessel;

(j) once a third stage regeneration vessel has been filled, contacting the second stage regenerated resin therein with third stage regenerant in a plug flow to provide the regenerated resin;

wherein after contacting the resin in step (j), the third stage regenerant is collected and added to the first stage regenerant.

The above processes may further include additional steps associated with ion-exchange processes for water treatment, as would be understood by a person skilled in the art. For example, the regenerated resin in the third stage regeneration vessels may be subjected to a rinsing stage to replace the regenerant with a suitable transfer fluid for subsequent use in a water treatment process. A suitable transfer fluid may be raw water. Conductivity sensors may be used to detect when sufficient regenerant has been removed. This allows the used third stage regenerant to be removed, collected and recycled as first stage regenerant.

As would be appreciated the loaded resin will be provided together with a transfer fluid, which may be the water being subjected to the ion exchange filtration treatment. It is thus preferable if the process includes the additional step of concentrating the resin (increasing the amount of resin in the transfer fluid) before filling a first stage vessel with the loaded resin. Likewise, it can be preferable to concentrate the resin before the resin is used to fill the third stage vessels. This can be a useful step as the concentration of the resin soaking in regenerant in the second stage may vary depending on the concentration of the resin in the first stage vessels. The concentration step can be performed by including a concentrator, such as a settling vessel, into which passes resin within a fluid. At least a portion of the resin settles within the vessel and with the excess and the fluid overflowing the vessel.

The use of concentrators before filling the first and third stage vessels may also permit the regulation of the regeneration process. The concentrators could be set to fill the first and third regeneration vessels depending on the availability of empty vessels or based on a desired concentration of resin or a combination of factors. If a vessel is not available then the concentrators will improve the efficiency of the next filled vessel by concentrating the resin whilst awaiting the next available empty vessel. The concentrator will then deliver more concentrated resin into the next empty vessel for subsequent processing.

To increase the rate at which the process can be operated and avoid unnecessary dilution of the regenerant, it is preferred to remove at least some of the transfer fluid from the first and also third stage vessels (in the latter the transport fluid is first stage regenerant), after they have been filled with resin and before respectively contacting the resin with first and third stage regenerant. Whilst gravity may be used to drain some transfer fluid from the vessels it is preferred to more quickly remove transfer fluid from the vessels by a suitable fluid extraction means, such as a pump. It is not necessary to removal all of the transfer fluid (nor is it considered possible) but the removal of a significant proportion of the transfer fluid so the resin bed is exposed, can improve the overall plug flow performance and avoid the unnecessarily dilution of regenerant.

The extraction means can continue to operate as the regenerant is applied to the resin, to draw the regenerant through the resin in a plug flow. Preferably the extraction means is a pump, such as a vacuum pump.

Preferably the outflows from the first and third stage vessels include sensors to monitor the fluid outflows (transport fluid and regenerant). Conductivity sensors can be used to detect the change in concentration. The use of plug flow results in less mixing of fluids and can provide clear interface between the fluid types which may be detected with conductivity sensors.

In an alternative aspect of the invention the second stage soaking regeneration step is omitted. Accordingly, in this aspect there is provided a process for the regeneration of loaded ion-exchange resin, the process comprising:

(a) providing loaded resin for regeneration;

(b) providing first and third stage regenerant suitable for regenerating loaded resin;

(c) providing a plurality of first stage regeneration vessels;

(d) providing a plurality of third stage vessels;

(e) filling a first stage regeneration vessel with a desired amount of the loaded resin before filling another first stage regeneration vessel;

(f) once a first stage regeneration vessel has been filled, contacting the loaded resin within the vessel with first stage regenerant in a plug flow to provide a first stage regenerated resin;

(g) transferring the first stage regenerated resin from a first stage regeneration vessel into a third stage vessel;

(h) contacting the first stage regenerated resin in the third stage vessel with third stage regenerant in a plug flow to provide the regenerated resin;

wherein after contacting the resin in step (h), the third stage regenerant is collected and added to the first stage regenerant.

However, it may be more difficult to regulate the process and as such it may be preferred to include an intermediate storage vessel for at least collecting the resin from the first stage regeneration vessels before the resin is transferred into the third stage vessels.

One of the benefits of the present invention is it can be used to provide a substantially continuous regeneration process with continuous inflow of loaded resin and outflow of regenerated resin suitable for use in a water treatment process.

Thus in a further aspect of the invention there is provided a process for the regeneration of loaded ion-exchange resin, the process comprising:

(a) providing first and third stage regenerant suitable for regenerating loaded resin;

(b) providing a plurality of first stage regeneration vessels;

(c) providing a second stage regeneration vessel;

(d) providing a plurality of third stage vessels;

(e) providing a first stage concentrator vessel;

(f) providing a third stage concentrator vessel;

(g) providing a storage vessel for containing regenerated resin in a transport fluid suitable for use in subsequent ion-exchange processes;

(h) providing a continuous flow of loaded resin for regeneration in a transport fluid into the first stage concentrator vessel and increasing the concentration of the resin within the transport fluid by allowing excess transport fluid to overflow the concentrator;

(i) filling an empty first stage regeneration vessel with a desired amount of concentrated loaded resin in transport fluid from the first stage concentrator before filling another empty first stage regeneration vessel with a desired amount of concentrated loaded resin from the concentrator;

(j) removing transport fluid from a filled first stage regeneration vessel and contacting the loaded resin within the vessel with first stage regenerant in a plug flow to provide a first stage regenerated resin in regenerant;

(k) transporting all first stage regenerated resin from first stage regeneration vessels into a second stage regeneration vessel and soaking the resin in first stage regenerant to provide second stage regenerated resin;

(l) providing a continuous flow of second stage regenerated resin from the second stage regeneration vessel into the third stage concentrator vessel and increasing the concentration of the resin by allowing excess first stage regenerant to overflow the concentrator;

(m) filling an empty third stage vessel with a desired amount of the concentrated second stage regenerated resin in first stage regenerant from the third stage concentrator before filling another empty third stage vessel with a desired amount of concentrated second stage regenerated resin from the third stage concentrator;

(n) removing first stage regenerant from a filled third stage vessel and contacting the resin therein with third stage regenerant in a plug flow to provide the regenerated resin;

(o) rinsing the regenerated resin in a third stage vessel with a suitable transport fluid and transferring the rinsed resin into a storage vessel to provide regenerated resin in a transport fluid suitable for use in subsequent ion-exchange processes;

(p) removing and collecting third stage regenerant from a third stage vessel containing regenerated resin and adding the collected regenerant to the first stage regenerant;

(q) collecting the excess first stage regenerant from the step (l) and returning it to first stage regenerant;

(r) repeating step (i) whenever there is an empty first stage regeneration vessel and sufficient resin to fill the vessel in the first stage concentrator;

(s) repeating step (m) whenever there is an empty third stage vessel and sufficient resin to fill the vessel in the third stage concentrator.

A continuous outflow of regenerated resin in a suitable transport fluid may be provided from the storage vessel for addition to a water treatment process.

Preferably the process is incorporated within an ion exchange water treatment process and the transport fluid in step (h) is water from the treatment plant. In that case the excess transport fluid (water) overflowing the first stage concentrator and from any filled first stage regeneration vessels may be returned to the treatment plant for subsequent treatment with resin (fresh or regenerated).

Preferably the transport fluid portion removed from first stage regeneration vessels may be returned to the treatment plant until regenerant is removed from the first stage regeneration vessels. The removal of regenerant may be detected by an appropriate sensor for the regenerant, such as a conductivity sensor for use with brine regenerant. The removal of regenerant may also be determined based on outflow or volume and based on historical precedents.

The process operates in a counter current manner, with new regenerant being added to the process as third stage regenerant. The used third stage regenerant containing some removed electrolytes is added to the first stage regenerant. With DOC removal, a proportion of the regenerant removed from the first stage regeneration vessels could be sent to waste to dispose of the extracted DOC. It is preferred to separate the first portion of the regenerant removed from the first stage regeneration vessels from the remainder of the regenerant removed from the first stage regeneration vessels. The first portion will contain a high concentration of the compounds which were loaded on the resin and this may be sent to waste or otherwise removed from the regeneration process. The remainder of the used first stage regenerant may be re-used as first stage regenerant. If the regeneration process is being used to recover valuable elements from process water then the first portion containing the highest concentration of the compound loaded on the resin may be separately processed to recover the valuable elements therein. The volume of the first stage regenerant removed from the process should be matched to the volume of liquid added to the first stage regenerant from the third stage vessels.

In the above aspects of the invention it is preferred to include a means for facilitating the transfer of resin from the first and third stage vessels. Once the regenerant has been subjected to fluid extraction (of regenerant or rinse transport fluid) the resin becomes less fluid. In order to facilitate the transfer of the resin it is preferred to re-fluidise the resin. This may be done by moving the resin about within the vessel by means of an impeller or agitating devices.

Alternatively, the resin may be re-fluidised by injecting a suitable transport fluid into the vessel. In the first stage a suitable transport fluid would be regenerant for use in the first stage vessels. The excess fluidising regenerant could be flushed through with the resin into the second stage vessel which contains the same regenerant. In the third stage, the regenerated resin could be fluidised with rinse transport fluid suitable for use in subsequent ion-exchange processes. The transport fluid may be raw water in a DOC removal process.

Although the above processes have been described with reference to a plurality of first and third regeneration vessels, the process could be conducted with only one first and third stage vessel. However, such a process would operate in a batch manner.

The processes could also be conducted by using a multi-function vessel, which operates as both the first stage and third stage vessel. The second stage regeneration vessel could be omitted or incorporated into the multi-function vessel.

Accordingly, in a further aspect of the present invention there is provided a process for the regeneration of loaded ion-exchange resin, such as resin loaded with dissolved organic carbon ("DOC"), the process comprising:

(a) providing loaded resin for regeneration;

(b) providing first stage and third stage regenerant suitable for regenerating loaded resin;

(c) providing a plurality of regeneration vessels;

(d) filling a regeneration vessel with a desired amount of the loaded resin before filling another regeneration vessel;

(e) once a regeneration vessel has been filled, contacting the loaded resin within the vessel with first stage regenerant in a plug flow to provide a first stage regenerated resin;

(f) contacting the first stage regenerated resin with third stage regenerant in a plug flow to provide the regenerated resin;

(g) removing and collecting third stage regenerant from a vessel containing regenerated resin and adding the collected regenerant to the first stage regenerant.

The action of the second stage vessel can be incorporated into the regeneration vessel by simply allowing the resin to remain soaking in first stage regenerant whilst in the regeneration vessel. This may not be desirable as it will further slow down the overall regeneration process, unless the system includes a number of multi-function regeneration vessels.

In a further aspect of the invention there is provided a process for the regeneration of loaded ion-exchange resin, the process comprising:

(a) providing loaded resin for regeneration in a holding vessel;
(b) providing first stage and third stage regenerant suitable for regenerating loaded resin;
(c) providing a plurality of regeneration vessels;
(d) providing a storage vessel for containing regenerated resin for use in subsequent ion-exchange processes;
(e) providing a continuous flow of loaded resin for regeneration in a transport fluid into the holding vessel;
(f) filling an empty regeneration vessel with a desired amount of loaded resin in transport fluid from the holding vessel before filling another empty regeneration vessel with a desired amount of loaded resin from the holding vessel;
(g) removing transport fluid from a filled regeneration vessel and contacting the loaded resin within the vessel with first stage regenerant in a plug flow to provide a first stage regenerated resin in first stage regenerant;
(h) removing first stage regenerant from a regeneration vessel containing first stage regenerated resin and contacting the resin therein with third stage regenerant in a plug flow to provide the regenerated resin;
(i) removing and collecting the third stage regenerant from a vessel containing regenerated resin and adding the collected regenerant to the first stage regenerant;
(j) rinsing the regenerated resin with a suitable transport fluid and transferring the rinsed resin into a storage vessel to provide regenerated resin in a transport fluid suitable for use in subsequent ion-exchange processes;
(k) repeating step (f) whenever there is an empty regeneration vessel and sufficient resin in the holding vessel.

Preferably loaded resin is concentrated before it is added to an empty regeneration vessel. The holding vessel may be a concentrator vessel which increases the concentration of the resin within the transport fluid by allowing excess transport fluid to overflow the concentrator, or may be coupled to a concentrator vessel.

In another aspect of the invention there is provided an arrangement of apparatus for use with above regeneration processes. The arrangement would include appropriately connected vessels, pipes, valves and sensors for operating the above described regeneration processes.

In a preferred embodiment of the invention at least a portion of apparatus for use in the process is provided in modular system. Preferably, the apparatus includes a module containing array (three or more) first stage vessels or third stage vessels together with associated operation systems. A modular system could allow a number of additional modules to be connected together to improve the regeneration rate of the resin.

A modular system could allow for standardisation of regeneration systems and enable the use of the same overall process with ion-exchange treatment plants of various resin throughput largely by changing the number modules. This could simplify maintenance and reduce associated costs.

In another aspect of the invention there is provided a method of regenerating ion exchange resins containing magnetic particles, preferably dispersed throughout the resin beads, more preferably MIEX® brand resin from Orica Australia Pty. Ltd, with brine having a concentration equal to or above 20% wt/wt, preferably equal to or above 30%, more preferably about 36% and most preferably a saturated brine solution.

The method could be operated to use lower concentrations, such as 5% or 10% wt/wt, and could be used with the third stage regenerant at a similar or the lower concentration than the first stage regenerant. In the latter case the method may require the addition of concentrated regenerant to compensate for the loss of concentration from the addition of third stage regenerant and any rinse portion.

DESCRIPTION OF THE INVENTION

Figure 1:
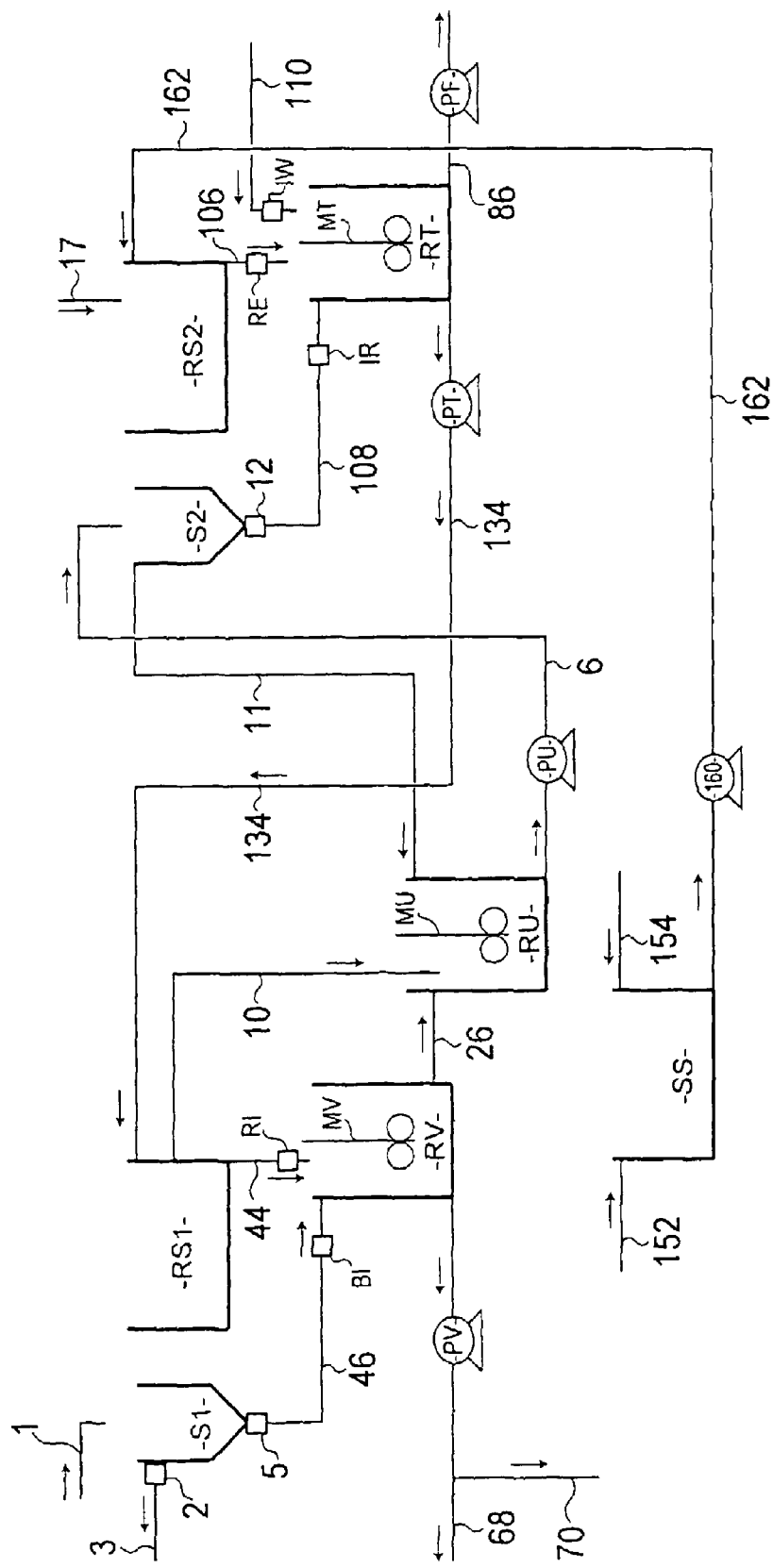
FIG. 1 is a schematic diagram of a regeneration process of the present invention showing apparatus and the movement of resin and regenerant and other fluids.

The expressions "regenerating ion-exchange resin" or "regenerating resin", as used herein refers to a process in which the ion-exchange capacity of a loaded (also referred to as spent or used) ion-exchange resin is returned to a level whereby it is rendered suitable for use in subsequent ion-exchange processes.

The water treatment plant may be a plant for producing potable water for distribution and consumption, or may be a plant for the treatment of sewage or industrial water treatment. An industrial water treatment plant may be associated with food processing, pharmaceutical production, electronic component manufacture, membrane plant rejects (usually derived from nanofiltration or reverse osmosis processing), hospital applications, power generation and the like. The resins in the water treatment plant may be used to remove undesirable compounds from the water or may be used to concentrate and collect desired compounds. By way of example, ion exchange resins have been used to concentrate valuable elements (such as gold, silver and uranium). While the present invention is useful in any large scale water treatment facility, it is particularly preferred for use in the treatment of a water source to produce potable water for distribution and consumption.

The preferred ion-exchange resin, MIEX DOC® Resin, is used in the removal of DOC and has cationic groups which provide suitable sites for the adsorption of the DOC. These cationic groups have associated anions which exchange with the DOC during the ion-exchange process. The regeneration process of such ion-exchange resins typically involves the displacement (or exchange) of the adsorbed DOC with chloride ions provided by a regenerant. Ion-exchange resins used in the removal of other types of compounds from water may have other types of groups and require different types of regenerants. For example Dowex ion exchange resins may be used to separate uranium from liquid media for mining and water remediation purposes. The ion exchange resins are normally used in fixed bed and continuous counter current systems. These type 1 resins (strong base anion resins) can be used to remove uranyl ions from water and can be regenerated with chloride ions, acidified nitrate solutions and sulphuric acid solutions. Similar types of resin systems may be used to remove hexavalent chromium from ground water (such as Purolite A-600) which can be regenerated with brine.

It is not necessary for all ion-exchange sites in a resin to be regenerated for an ion-exchange resin to be considered "regenerated" for the purpose of the present invention. It is sufficient that the regeneration process has occurred to an extent that the ion-exchange resin is useful in subsequent ion-exchange processes in a water treatment plant. For example with resins used to remove DOC preferably more than 80% of the ion-exchange sites previously taken up by the DOC or other compounds are regenerated, more preferably greater than 90% and most preferably greater than 98%.

DOC loaded ion-exchange resin may be regenerated by contact with a suitable regenerant, such as an aqueous chloride salt solution which allows the chloride ions to exchange with the DOC adsorbed on the resin. The preferred chloride salt is NaCl although other chloride salts can work. Accordingly, the most preferred regenerant for use with MIEX® is brine (substantially a NaCl solution). Preferably the regeneration of DOC loaded MIEX DOC® resin is carried out with an aqueous chloride salt solution in which the initial chloride salt concentration (as used at the third stage of regeneration) is more than 1.5M, or more preferably 2M or greater.

The process of the invention can provide for continuous or near continuous inflows and outflows of loaded and regenerated resin respectively, although the process incorporates batch processing steps within an overall processing system. A continuous stream of resin can be fed into an initial vessel from which the loaded resin is subjected to batch regeneration processes within the regeneration system and delivered into a storage vessel from which a continuous flow of regenerated resin can be returned to the treatment plant.

The present invention includes a multi-stage regeneration system which comprises a first regeneration stage, an optional second soaking regeneration stage and a third regeneration stage. The third regeneration stage may be followed by rinsing/washing step. The difference between the first and third regeneration stages is related to the concentration of the regenerant solution which passes from the third stage to the first stage (and may also be used as the soak regenerant in the second stage). The regenerant used in the third stage may be of a stronger regenerant concentration than that used in the first stage and this is achieved in practice by directing the flow of regenerant, after coming into contact with resin in the third regeneration stage, to the first stage. This provides a counter current flow and in addition to improving the effectiveness of the regeneration process, it may also provide another benefit in that the treated resin does not initially come into contact with highly concentrated regenerant which may cause osmotic shock and damage the resin.

The first and third regeneration stages are preferably conducted in separate regeneration vessels, although it is envisaged that the process could be conducted within the same vessel, although this would increase the complexity of the plumbing. The use of specialised first and third vessels should provide process efficiencies, particularly with larger qualities of resin. It also offers the advantage of the intermediate soaking phase in the second vessel. However, the use of multi-function regeneration vessels can offer benefits in plant cost and footprint, and offers advantaging in flow control despite the need for additional control plumbing.

Some of the benefits arising from the second stage soak tank can be effectively provided by allowing the resin to sit in first stage regenerant after drawing off the initial portion of the regenerant. Although the soaking step would slow down the processing of the resin, it can be an option when the regeneration system has unused capacity, which can happen when the water treatment plant is running at reduced rates or because the regeneration plant has available multi-function vessels at the relevant time. In an embodiment of the invention the process would include a soaking step of variable length, with the length being governed by the overall regeneration process rates, and the needs of the water treatment plant.

It is preferred to use multiple regeneration vessels in order to permit the simultaneous processing of loaded resin through the regeneration process. By such a process, resin in a first stage vessel can be contacted with regenerant, whilst resin may be added to another first stage vessel and whilst excess raw water may be removed from a further first stage vessel. This reduces the lag time and improves the processing rate of the loaded resin. It also reduces the inventory requirement on the plant. Likewise, multiple third stage regeneration vessels may be used to improve the processing rate of the regeneration step and any washing/rinsing step. The resin in a third stage vessel may be contacted with the regenerant, the regenerated resin in another vessel may be subjected to a rinsing step whilst yet another third stage vessel is filled with resin. The number of first and third stage vessels required for efficient operation will depend on a number of factors such as the type of resin to be regenerated, the amount and nature of the chemicals to be removed from the water, the throughput of the treatment plant, the effectiveness and pumping rate of the pumps used to extract water and regenerant and the size (capacity) of the regeneration vessels.

It will be appreciated that it is not necessary for the first and third stage vessels to be separate and distinct vessels. The invention also includes the use of multi-function regeneration vessels, where the multi-function vessel can function as either a first or third stage regeneration vessel. The same advantages can also apply when using multiple multi-function regeneration vessels.

Unless otherwise indicated (expressly or implied), reference to a first or third stage vessel includes the use of a multi-function vessel respectively operating as a first or third stage vessel. Reference to a second stage vessel includes the use of a separate second stage vessel as earlier described in conjunction with the multi-function vessels, but also includes the use of a multi-function vessel as a limited second stage vessel by simply allowing the resin to soak in the regenerant.

Although dedicated regeneration vessels may offer some process advantages in timing, it is envisaged that the use of multi-function vessels may offer significant additional benefits. Although the cost per vessel may be increased due to the additional complexity of the system, the overall cost of the regeneration plant may be reduced, as less equipment (plumbing and vessels) may be required to operate the system. Piping could be used for multiple functions with the function controlled by assorted switching valves. It would remove the need to connect the first stage vessels to second and third stage vessels. It could remove the need for a third stage concentrator, if the resin remains within the same vessel. It may also shorten the overall time it takes to regenerate the resin as it removes the need to mobilise and pump the resin into a second stage vessel and then into a third stage vessel. Furthermore, it may reduce the total number of required vessels (and footprint) if the vessel volumes have been standardised (which would provide significant manufacturing and maintenance cost benefits). For example, a water treatment plant requiring 1.4 first stage vessels and 1.4 third stage vessels (based on volume) would require 2 first stage vessels and 2 third stage vessels, whereas 3 multi-function vessels should be sufficient (assuming the first and third stage processing times are substantially the same).

The vessels may take the form of columns, tanks (including mixing and/or settling tanks) and the like. Preferably the regeneration vessels will be standardised in size, and the use of two standard sizes is envisaged—600 mm (2 ft) by 600 mm by 1800 mm tall (6 ft) and 1200 mm (4 ft) by 1200 mm by 1800 mm. The tanks are square or round with a resin bed height set at 600 mm (2 ft). Preferably the regeneration vessels take the form of mixing tanks may be fitted with a mechanical stirring device. In order to facilitate "plug flow" operation each regeneration vessel may be fitted with separate inlet valves to allow for the addition of resin, regenerant, and optionally water, into the regenerant vessel. Alternatively, one or more of the resin, regenerant and water may be fed into the vessels via a common inlet valve connected to a feed pipe connected to separate resin, regenerant and water feeds. Each feed pipe may have separate closures or a downward arrangement of feed pipes together with gravity can be used to prevent the feeds intermixing and backflow. Preferably the inlet valves are positioned at the top of the vessels. At the base of each regeneration vessel is an outlet valve, which allows for the removal of the aforementioned elements from the regeneration vessel.

Regeneration is effected by filling a regeneration vessel with resin and transfer fluid (typically untreated water for the first stage or recycled regenerant for the third stage) via the resin or common inlet valve. Once the resin has been added, excess transfer fluid is removed by a suitable means such as by vacuum pump and a predetermined quantity of regenerant (which may be determined by mass, flow rate or volume) is then added to the resin. The regenerant may be allowed to contact the resin for a time before being moved through the vessel as in plugflow. Alternatively, the regenerant is simply added and moved through resin in a plugflow as soon as the excess transfer fluid has been removed. In effect the vacuum pump could remain in operation as the regenerant is added to the vessel to pull the transfer fluid and then most of the plug of added regenerant. A rinse/wash step can be conducted in a similar manner in the third stage vessel.

The first stage regeneration will normally involve larger volume of regenerant than the third stage regeneration. Available process time is the primary constraint as moving large qualities of first stage regenerant through the first stage vessel would slow down the overall process time and may not significantly improve the regeneration of the resin.

The first fraction of the first stage regenerant is typically removed from the process and this loss is made up by the addition of regenerant collected after the third stage regeneration step. The third stage regeneration of the resin does not require a large volume of regenerant. The third regenerant is more concentrated than the first stage regenerant, and may be a saturated solution. A low volume of third stage regenerant followed by a rinse solution can be moved in a plug flow through the resin. The use of concentrated regenerant in a plug flow reduces the intermixing of the regenerant into the rinse solution.

For illustrative purposes, it is possible to use 0.1 bed volumes (BV) of third stage regenerant followed by the rinse, and find that the liquid removed from the vessel contains no significant amount of regenerant after 0.2 BV. The collected regenerant, diluted by the rinse, (0.2 BV) would then be added to the first stage regenerant. The first stage regeneration may involve the application of 1 BV of first stage regenerant and would allow for a first fraction of 0.2 BV to be removed and sent to waste or processing.

Although a vacuum pump may be used to pull transfer fluid and a plug of regenerant through the resin, it is envisaged that other systems may also be effective. Where time permits gravity could be used to move the fluids through the vessel. Alternatively a positive pressure could be applied within the vessel to push the fluid and regenerant through the resin.

Sensors may be used monitor and regulate the levels of regenerant, resin or water added to the regeneration vessel to avoid overfilling the vessel. Sensors may also be used to monitor the fluid outflows from the vessel. The sensors can be fitted to the inlet and outlet valves and as such can regulate the flows of the aforementioned elements within the regenerant vessels.

The use of sensors, such as conductivity sensors, or measuring outflow volumes and comparison to precedent values (essentially a computerised memory based on look up tables from calibration testing) may allow for highly effectively separation of the types of outflows from the regeneration vessels. A conductivity sensor could detect when the plug of regenerant brine has reached the sensor and effect a redirection of the outflow. When the outflow is simply transfer fluid then the outflow can be returned to the raw water supply (when the transfer fluid is raw water) or to a supply of first/second stage regenerant (when the transfer fluid is first/second stage regenerant as used with the resin in the third stage regeneration vessels). However, when the outflow is the regenerant plug as indicated by an increase of conductivity by the change from raw water to first stage regenerant or from first/second stage regenerant to the more concentrated (and thus more conductive) third stage regenerant then the outflow may be redirected as appropriate. The outflow of the third stage vessel could again be redirected when the plug of rinse water passes through the vessel. The sudden drop in conductivity would signal a need to redirect the output or to simply empty the third stage vessel of washed and regenerated resin. The use of sensors in this manner combined with a switching system to redirect outflows may provide substantial improvements in the regeneration process as it avoids discarding unnecessary fractions and avoids unnecessary dilution of the regenerant.

For example, as mentioned earlier the first fraction of regenerant from the first regeneration vessels will contain the most concentrated mixture of the chemical which was loaded on the resin in used regenerant. Depending on the process, this fraction could be sent to waste disposal (for DOC) or retained for subsequent processing (to recover useful chemicals). The remainder could be returned to a first/second regenerant storage vessel for subsequent re-use. The regenerant from the third stage vessel can all be sent to a storage vessel for use as first/second stage regenerant, although it is possible that the portion of the latter more concentrated third stage regenerant could be recycled as third stage regenerant. The latter option may be complex as it may require adding the initial fraction (containing highest concentration of exchanged electrolytes) to the first stage regenerant, recycling the bulk fraction and then adding the end fraction covering the interface between the third stage regenerant and a rinse solution. Where the regenerant is brine the start of the end fraction could be sensed by a decrease in conductivity due the dilution of the brine with a water rinse solution.

Once a rinse solution passed through to the sensor then the outflow could be redirected so to send any excess rinse solution back into the raw water supply (or simply trigger the emptying of the third vessel). The overall regeneration process could thus be controlled by a programmable machine.

One of the benefits of having multiple vessels is that it is possible to service selected vessels without shutting down the whole regeneration system (and possibly the treatment plant). Individual vessels could be taken out of service for maintenance and, depending on the size of the regeneration system, the other components of the system could compensate.

In a preferred embodiment the loaded resin is initially fed from the contactors (or settlers associated with the contactors as described in WO 96/07615) of a water treatment plant into a concentrator. Preferably the concentrator is transfer vessel with a conical shaped base. Any excess water may overflow the rim or through apertures in the walls and can return back to the raw water contactors. This can be achieved via the use of a pump or by simply locating the concentrator above the contactors in the treatment plant. It is preferred to locate the concentrator transfer vessel at a position higher than the first stage regeneration vessels so the concentrated loaded resin may be gravity fed into these vessels. It is also preferred to include a first stage regenerant storage tank for containing the regenerant used in the first stage regeneration vessel(s) and locate the tank higher than the first regeneration stage vessels to permit the vessels to be gravity fed with regenerant.

The concentrator can also take the form of a resin transfer tank, which would accumulate and thicken loaded resin removed from a contactor collected at the settler. The transfer tank could receive side-stream or a timed split, or the entire flow from the resin recycle pump (or at least one pump in multiple pump systems). The return flow of resin from the settler could pass through a splitter box which directs a portion, in the order of 5 to 15% into the transfer tank, with the remainder being returned to the contactors. The splitter box is an open channel with an adjustable gate to diver a set portion of the return resin flow into the transfer tank. It would be possible to divert all the resin into the transfer tank but it may be more practicable to divert only some of the resin.

Ideally the transfer tank would be located such that its top water level is above the contactor(s) water level and allow excess resin and water to overflow to the contactors. There will be two sources of overflow from the transfer tank to the contactors—one from the transfer tank itself as in a typical overflow arrangement and the other from the splitter box used to divert a portion of the resin to the transfer tank with the majority of the return flow proceeding to the contactors.

This concentrator system avoids the need for a flow meter and controls to divert the required resin volume to regeneration from the settler. The transfer tank can continuously accumulate and thicken resin, with the excess of resin overflowing back into the contactors, as the regeneration rate will be determined by the availability of regeneration vessels. The resin transfer tank may concentrate the resin to about 500-700 ml/l before sending it to the regeneration tanks.

In relation to the third stage regeneration vessels it can be preferred to thicken the resin in another concentrator transfer vessel before subjecting the resin to third regeneration stage. This may be useful if the resin has been physically moved from a first stage regeneration vessel. The excess regenerant can simply overflow the concentrator (the rim or via apertures in the side wall) and would gravity feed back into the first stage regenerant storage tank. It would be preferred to have the third stage concentrator vessel located above the third stage regeneration vessels to permit the gravity filling of the third stage vessels with the resin.

It is preferred to include a second resin regeneration stage in the form of a resin storage tank between the first and third regeneration stages. The storage tank is preferably fitted with a mechanical stirrer to effect efficient mixing of the regenerant and resin. The regenerant which fills this resin storage tank may result from the first stage regenerant storage tank, and particularly any overflows from that tank, and the regenerant overflow from the third stage concentrator. An advantage of adding the storage tank is the additional soak or contact time in the regenerant allows for more effective regeneration. In addition such a storage tank would provide a convenient location for the operator to store the inventory of resin in brine regenerant if the entire system is shut down for maintenance. Storing the resin in a regenerant (brine) solution can avoid the problems associated with the build up of microbial deposits which can occur if the resin was stored in fresh water.

The regenerated resin may be directly returned to the contactors, or may be stored in a fresh resin storage tank, which may be conveniently located above the contactors. Fresh resin can then be gravity discharged from the storage tank into the contactors and, in the event of a system failure, resin overflowing from the storage tank will also feed into the contactors.

It will be appreciated that the regeneration system could be used to regenerate fixed bed resin systems, continuous counter current resin systems as well as a fluidised resin system made possible with MIEX® resin. The regeneration system may be used alone or in conjunction with membrane filtration techniques.

The regeneration system may be incorporated into the overall process of existing ion-exchange treatment plants. It may be used in conjunction with ion exchange resin processes combined with membrane filtration systems. The combined treatment and regeneration process with ion exchange resin may improve the effectiveness of the membranes, increase the flux across membranes and reduce operating costs. For new installations it may be used where existing membrane filtration techniques are replaced with ion-exchange techniques.

If membrane filtration techniques are still required, the present invention can be used where ion-exchange processes are incorporated to significantly reduce the size and hence capital and operating cost of a membrane filtration plant. The reduction in capital and operating costs may enable consideration to be given to the installation of membrane filtration rather than coagulation/sedimentation plants thereby substantially reducing the size of the plant and enabling the production of potable water without the addition of chemicals other than for disinfection purposes. Examples of water treatment processes involving ion-exchange are disclosed in WO96/07615, and the present regeneration process can be readily incorporated into these processes.

Accordingly, the invention also provides an industrial scale process for the removal of DOC from water containing DOC, said process comprising:
(i) contacting the water with ion exchange resin to enable adsorption of DOC on the resin;
(ii) separating at least a portion of the resin loaded with DOC from the water; and
(iii) regenerating at least some of the separated resin, wherein the resin is regenerated with the above described regeneration process.

Accordingly, in a further aspect the present invention provides an industrial scale process for the removal of DOC from water containing DOC, said process comprising:
(i) contacting the water with ion-exchange resin to enable adsorption of DOC on the resin;
(ii) separating at least a portion of the resin loaded with DOC from the water;
(iii) regenerating at least some of the separated resin, wherein the resin is regenerated by the above described process; and
(iv) returning the regenerated resin back to step (i).

In processes involving MIEX® resin the raw water is generally fed into a continuously stirred tank (the contactor) which has a nominal residence time usually of between about 5 and 60 minutes. The magnetic ion-exchange resin is added either directly into this tank or into the raw water in the pipeline feeding this tank. It is in this tank that the majority of the ion-exchange process occurs. Prior to treatment with the ion-exchange resin the water will generally have been screened to remove large particles to protect pumps involved in pumping the water to the treatment plant. It is also possible that the water will have been subjected to one or more pre-treatment steps, such as coagulation/flocculation and subsequent clarification.

From the contactor, the resin and water (resin suspension) is generally passed to a separating stage (settler) where the resin can be recovered and regenerated and/or returned. Depending on the density of the resin it may be possible to recover it using gravity sedimentation. As mentioned earlier, magnetic ion-exchange resins have a strong tendency to agglomerate to form large and fast settling particles, when shear is removed (as occurs in the settler). The agglomerated resin particles settle rapidly and are collected on the bottom of the settler where they may be transferred (eg. by pumping) back to the head of the treatment plant for reuse in the process. At least some (and generally a small portion) of the flow which is returned back to the head of the plant can be subjected to the regeneration process of the present invention. To keep the resin concentration at the required level, fresh, regenerated resin is added to the contactor to make up for the resin not being returned. The present invention allows for this process to be done in a continuous manner. This ensures the performance of the process is maintained.

After separation of the ion-exchange resin from the water it is usual to subject the water to further processing before it is suitable for distribution and consumption. The water may be subjected to a coagulation/flocculation step followed by clarification. Typically, coagulants such as alum (aluminium sulphate), iron salts and synthetic polymers are used following the ion-exchange step. The removal of DOC by ion-exchange results in a substantial reduction in the quantity of coagulant required. In addition, the removal of DOC reduces the requirement for subsequent chemical additions and improves the efficiency and/or rate of coagulation, sedimentation and disinfection. This has a beneficial impact on the water quality produced and the size of most facilities required within the water treatment plant including sludge handling facilities. The water may also be subjected to one or more of the filtration steps described above, as well as disinfection. The disinfectant may be added at any stage during the water treatment process. Usually however, disinfectants are added during or at the end of the treatment process such that there is residual disinfectant present in the water supplied to the consumer. This is known as secondary disinfection and most commonly involves the use of chlorine, chloramines and chlorine dioxide. However, in order to achieve disinfection of water ozone, potassium permanganate, peroxone, UV radiation and combinations of the above, can also be used as primary disinfectants.

The water treatment process may also be used in conjunction with other unit processes such as ozonisation and treatment using granular activated carbon (GAC). These optional features may be incorporated at any suitable stage during the water treatment process, as would be appreciated by a person skilled in the art.

The regeneration processes of the present invention may be utilised in the above described treatment processes or similar treatment processes, involving an ion-exchange process. For example many processes rely on ion-exchange to produce high quality water on an industrial scale. These include, but are not limited to, softening (ie. all salts transformed into sodium salts), demineralisation (removing compounds such as $Ca(HCO_3)_2$, $Mg(HCO_3)_2$, $CaSO_4$, $MgSO_4$ etc.), nitrate, chromate and uranium removal. A wide range of inorganic compounds and organometallic compounds can be removed by using appropriate ion exchange resins, such as described in U.S. patent application Ser. No. 11/124,624 entitled "Inorganic Contaminant Removal from Water", filed on 6 May 2005 by Bourke and Nguyen and incorporated by cross-reference, and these ions include perchlorate, sulfate, nitrate, phosphate, phosphite, bromide, bromate, arsenic, chromium and barium ions. These waters can then be used in a wide range of applications such as boiler feedwater, potable water or as high quality process water for the pharmaceutical manufacture, electronic component manufacture and the chemical industry. The regeneration process may be useful in these applications.

Embodiments of the invention will now be further described by reference to the accompanying drawings.

Although it is described by reference to raw water and a cationic resin system for removing DOC, it should be understood that the regeneration system may be used with other types of resins and regenerants.

The resin regeneration system depicted in FIG. 1 consists of two settler tanks (S1 and S2) which have conical shaped bases, first stage of regeneration vessels (RV) fitted with mechanical agitator/mixer (MV), second stage regeneration vessel (RU), fitted with an agitator/mixer (MU), and third stage regeneration vessels (RT), fitted with an agitator/mixer (MT). The system also comprises regenerant storage tanks (RS1 and RS2), a salt saturator (SS), and a series of pumps (PV, PU, PT, PF and 160).

Figure 2:
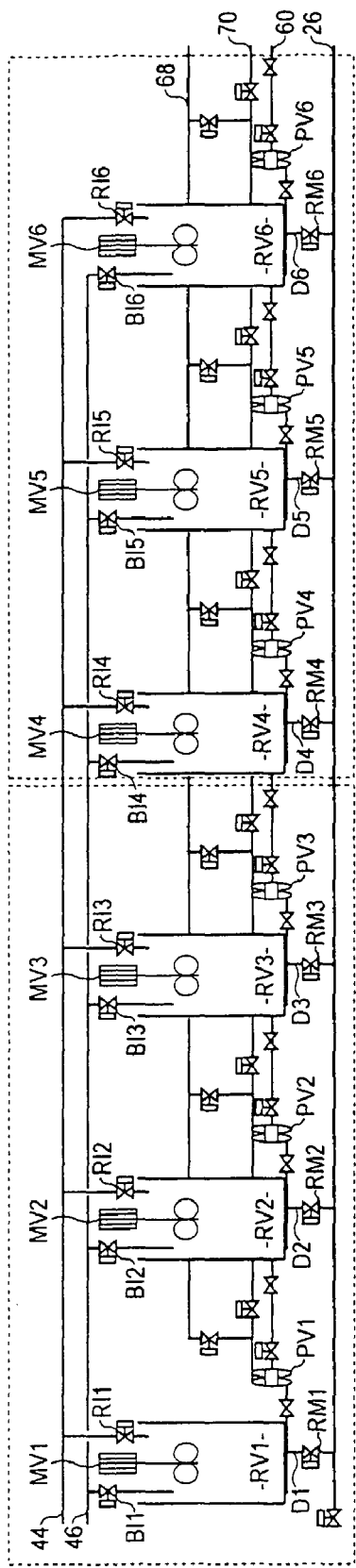
FIG. 2 is a schematic diagram of a series of first stage regeneration vessels for use in the process of the present invention.
Figure 4:
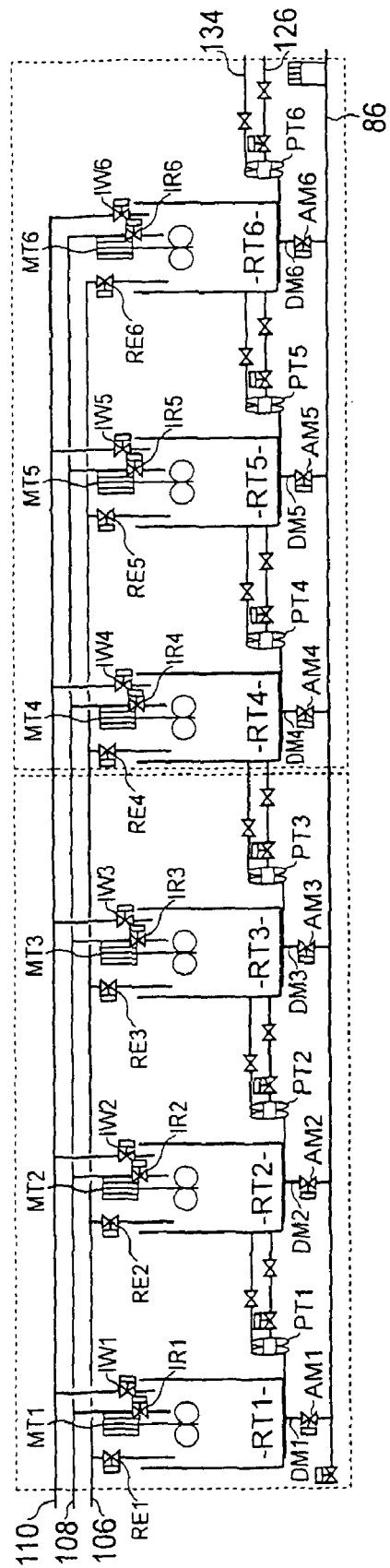
FIG. 4 is a schematic diagram of a series of third stage regeneration vessels for use in the process of the present invention.

For ease of explanation the three stages of regeneration vessels will each be treated as a single vessel. However, in practice RV and RT each comprise an array of vessels as shown in FIGS. 2 and 4. RU is a single vessel. After the loaded resin has been removed from the water treatment process for regeneration, the resin is transferred to S1 by feed line (1). The tank S1 is fitted with an overflow valve (2) set to the desired level in the tank. The resin settles in S1 with the raw water overflowing back to the raw water treatment plant contactors via the overflow line (3). The S1 tank can also operate as a concentrator whereby the concentration of resin in the tank is increased. S1 is also fitted with an outlet valve (5) at its base, which is connected to a common manifold (46) to supply RV. When RV is ready it will open its resin inlet valve (BI) and fill with resin/water from S1. Since S1 fills to a set level, RV cannot be overfilled with loaded resin.

The loaded resin will usually contain amounts of water left over from the water treatment process. Accordingly, once filled RV is de-watered using its associated vacuum pump (PV). This raw water can be directed back to the contactors via line (68). Once the loaded resin bed is exposed, regenerant is added to RV from RS1 at constant pressure by opening an inlet valve (BI) for a set period. The regenerant from RS1 is supplied by pumping (PT) the used regenerant from RT via common regenerant discharge line (134).

Water is removed from the resin bed of RV is directed to the contactors via line (68) until salt is detected (using a conductivity sensor) at which time the fluid is diverted to the waste treatment/disposal system via waste treatment/discharge line (70). The regenerant could be used in more than one regeneration cycle. In such arrangements the initial portion of the regenerant (containing the highest concentration of BOC) may be to waste with the reminder recycled to RS1.

Once the high DOC portion of regenerant is removed from the resin bed the contents of RV are mixed and transferred by a common resin outlet line (26) to second stage tank RU. This tank contains regenerant which is sourced from the overflow of RS1 via the regenerant storage tank overflow line (10) and the settler tank S2 via the settler tank overflow line (11).

After a defined residence time (which may involve mixing using MU) the resin/regenerant is pumped (PU) via line (6) into S2. The resin is allowed to settle (thicken) before being transferred to RT. S2 is also fitted with an outlet valve (12) at its base, which is connected to a common line (108), which is connected to the resin inlet valve (IR) of RT.

When RT is ready it will open its resin inlet valve (IR) and fill with the resin in S2. Since S2 also fills to a set level, RT cannot be overfilled with resin. Once filled with resin, the fresh regenerant inlet valve (RE) is opened and RT is filled with fresh regenerant via a constant pressure line (106). The regenerant is then pumped (PT) from the resin bed and directed via (134) to RS1, while water inlet valve (IW) is open. This adds water from a common water line (110) to the resin bed to wash the remainder of the regenerant from the bed.

Figure 3:
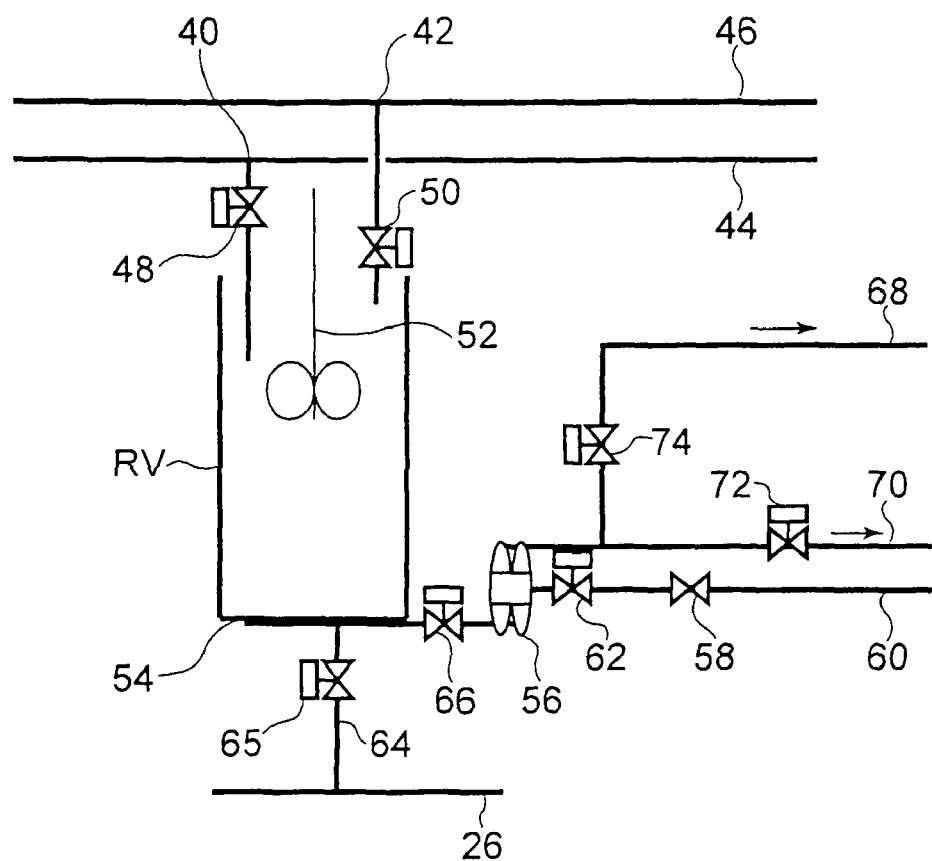
FIG. 3 is a schematic diagram of a single first stage regeneration vessel for use in the process of the present invention.

When the conductivity of the regenerant being sent back to RS1 begins to drop (as the water comes through), the resin is mixed and the fresh resin pumped (PF) to the contactors via the common resin outlet line (86) to be used for further raw water processing. Fresh regenerant is prepared in (RS2) by transferring by pump (160) a saturated salt solution, for example brine, from SS via saturated feed line (162) to RS2, and then diluting to a desired concentration through the addition of water from water feed line 17. Salt and water are added to the saturator SS by feed lines 152 and 154 respectively, FIG. 2 depicts a series of first stage regeneration vessels (RV1-RV6). Each of the vessels is connected to a resin delivery line (46) and a regenerant supply line (44). Each of the vessels is also fitted with inlet valves for both the resin (RI1-RI6) and regenerant (BI1-BI6), and a mechanical impeller agitator and motor (MV1-MV6). The vessels are also fitted with a discharge pipe (D1-D6), which directs resin through a resin outlet valves (RM1-RM6) to a common resin outlet line (26). By virtue of valve directed air pumps (PV1-PV6), the fluid discharge can be directed to a common raw water contactor line (68) or waste treatment/discharge line (70). Each pump is also fitted with a common air supply line (60). The dashed lines signify that the vessels can be set up in a transportable module like a shipping container and if required, two such transportable modules can be placed side by side and connected in order to increase the regeneration capacity of the system. FIG. 3 depicts a single first stage regeneration vessel (RV) fitted with two TEE connectors (40) and (42) respectively fitted to regenerant supply line (44) and resin supply line (46). The lower ends of TEE connectors are located within the regeneration vessel. The supply lines are isolated by valves (48) and (50), which are used to regulate the flow of regenerant and resin respectively. These valves can be ball valves, for instance George Fisher Actuated valves.

The regeneration vessel (RV) can be any suitable commercially available vessel, for instance an E66 Nylex tank. The regeneration vessel itself is of uniform dimensions and is fitted with a mechanical stirrer (52) and a drainage screen (not shown).

At the base of the vessel below the drainage screen is fitted a discharge line (54) which is connected to an air pump (56) via valve (66). The air pump is connected via an air supply isolation valve (62) to an air supply pipe (60) fitted with an air supply solenoid (58). The valve (66) regulates removal of fluids from the vessel. The fluids removed through valve (66) can be returned to raw water treatment contactors via line (68) or sent to waste via line (70). The lines are regulated by the insertion of appropriately placed valves (72) and (74).

A separate resin discharge line (64) is connected to the base of the vessel above the drainage screen. The line is fitted with a valve (65), which can be a ball valve, and is used to remove the resin from the vessel. The resin passes into the common resin discharge line (26).

FIG. 4 depicts a series of third stage regeneration vessels (RT1-RT6). Each of the vessels is connected to a resin delivery line (108), regenerant supply line (106) and water line (110). Each of the vessels is also fitted with inlet valves for the resin (IR1-IR6), regenerant (RE1-RE6) and water (IW1-IW6), a mechanical impeller agitator and motor (MT1-MT6) and a drainage screen. Each vessel is also fitted with a discharge line (DM1-DM6), which directs resin through a resin manifold (AM1-AM6) to a common resin outlet line (86). By virtue of valve directed air pumps (PT1-PT6) the fluid discharge can be directed to a common regenerant discharge line (134). Each pump is fitted with a common air supply line (126). The dashed line signifies that the vessels can be set up in a transportable module like a shipping container and if required, two such transportable modules can be placed side by side and connected in order to increase the regeneration capacity of the system.

Figure 5:
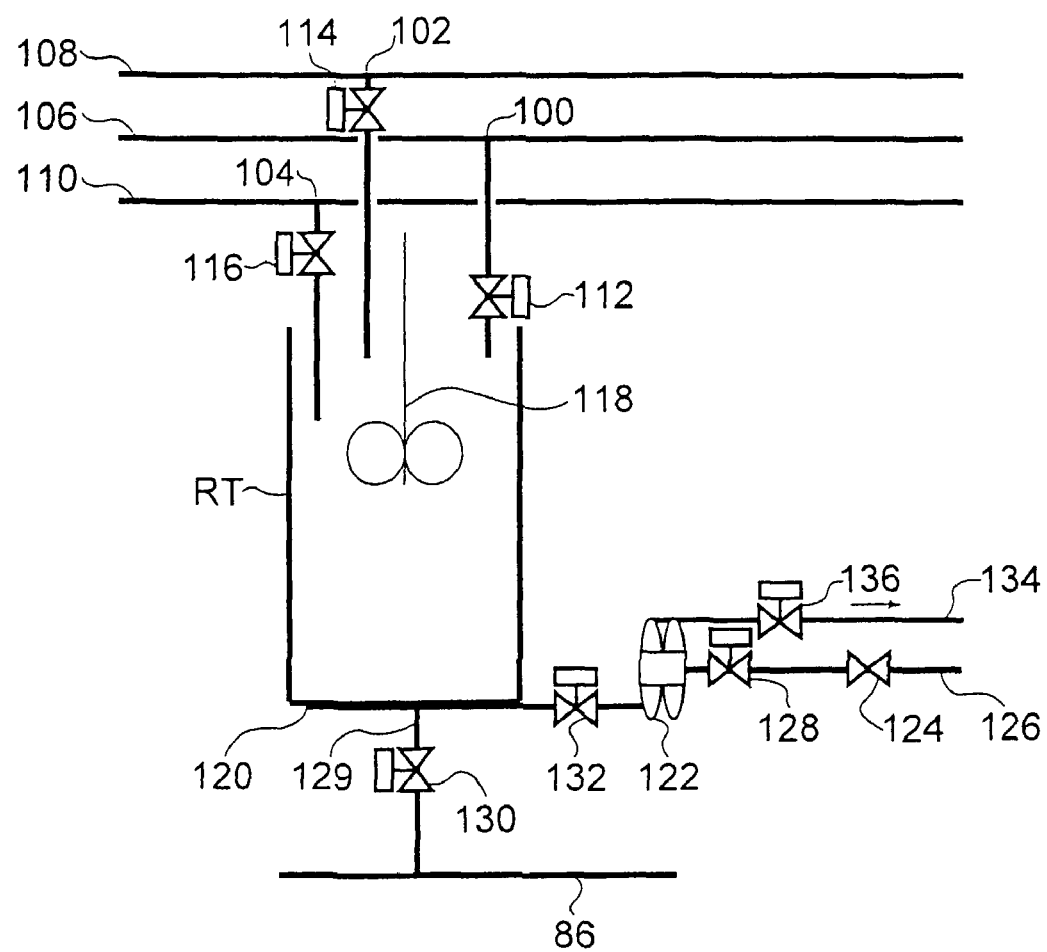
FIG. 5 is a schematic diagram of a single third stage regeneration vessel for use in the process of the present invention.

FIG. 5 depicts a single third stage regeneration vessel (RT) fitted with three TEE connectors (100), (102) and (104) respectively fitted to regenerant supply line (106), resin supply line (108) and water supply line (110). The lower ends of TEE connectors are located within the regeneration vessel. The supply lines are isolated by valves (112), (114) and (116), which are used to regulate the flow of regenerant, resin and water respectively. These valves can be ball valves, for instance George Fisher Actuate valves.

The regeneration vessel (RT) can be any suitable commercially available vessel, for instance an E66 Nylex tank. The regeneration vessel itself is of uniform dimensions and is fitted with a mechanical stirrer (118) and a drainage screen (not shown).

At the base of the vessel below the drainage screen is fitted a discharge line (120) which is connected to an air pump (122) via valve (132). The air pump is connected via an air supply isolation valve (128) to an air supply pipe (126) fitted with an air supply solenoid (124). The valve (132) regulates removal of fluids from the vessel. The fluids removed through valve (132) can be returned to the first stage regeneration system via line (134). This line is regulated by valve (136).

A separate discharge line (129) is connected to the base of the vessel above the drainage screen. The line is fitted with a valve (130) and is used to control the removal of resin from the vessel. Suitable valves include ball valves. The resin passes into a common resin discharge line (86) for return to the contactor The following describes an envisaged control system that could be used with the regeneration system depicted in FIGS. 1, 2, 3, 4 and 5. Inputs to the control system could include the positions of actuated valves, the readings obtained from conductivity analysers and level sensor readings. Each regeneration vessel could be equipped with level sensors and transmitters to provide a continuous reading of tank level. The drain pump discharge for each vessel may have a conductivity analyser fitted to the discharge to provide the signal to divert flow when a change from low conductivity to high conductivity is detected.

Stage One (RV1-RV6) Tank Control

Initial Conditions

A stage one (RV1-RV6) tank is empty in "regeneration completed" status and no other RV1-RV6 tank is filling with resin (if not then wait until a tank is ready)
Step 1: Open Associated Resin Fill Valve (50)
   Keep valve open until tank high level set point is reached
   Close resin fill valve
Step 2: Start drain pump (56) and open associated discharge valve (74) with the water pumped to raw water contactors (68).
   Once the tank remains constant (within a boundary limit) open the associated regenerant valve (48)
   Close valve when level set point is reached
Step 3: Continue drain pump (56) operation until the high conductivity set point is triggered—open discharge valve to waste (72) and close discharge valve to contactors (74) and continue drain pump operation until the tank level drops by a set value (stop level equals initial level minus drop value)

Step 4: Stop drain pump (56) and close associated discharge valve (74)
   Start associated mixer (52) and mix for 5 minutes
   Open associated resin transfer valve (65) to second stage tank (RU)
   Close valve after set time and tank level=0 m (within boundary limits)

Stage Two (RU) Tank Control

A high level alarm in the second stage tank will inhibit all stage one tanks from transferring resin.

A high level in the second stage tank will automatically reduce the fill set point for regenerant.

A low level in the second stage tank will increase the fill level in the first stage tanks for regenerant.

Stage Three (RT1-RT6) Tank Control

The control methods for stage three are similar to stage one with initial conditions required to be satisfied prior to the initiation of the sequence for each tank. The general steps are:
Step 1: Open resin fill valve (114)
   Fill with resin and brine to set level
   Close resin fill valve (114).
Step 2: Begin drain pump (122) operation and open discharge valve (136)
   Discharge to first stage regenerant storage tank (RS1)
   Upon a stable level reading (resin bed exposed) open fresh brine valve (114)
   Close fresh brine valve once set level is reached
   Continue drain pump (122) operation.
Step 3: Upon a stable level reading, which indicates that the resin bed has been exposed for the second time open water supply valve (116) and fill to set level.
Step 4: Continue drain pump (122) operation until conductivity of discharge drops below a set value.
   Stop drain pump (122) and close discharge valve (136).
Step 5: Start mixer (118) and mix for 5 minutes
   Open resin discharge valve (130) for set time or until tank level is 0 m and operate resin pump (PF) and discharge to contactors via line (86).
   Signal to computer that the "regeneration completed".

Overall Control

Waste volume generated and salt consumption can be adjusted by altering the set points in the first stage sequence. The salt concentration in the second stage tank can be influence by changes in the fresh brine concentration. Both the first and third stage processes have an impact on the condition of the second stage tank.

The second stage tank will be equipped with level and conductivity sensors to provide continuous feedback on the system performance. The second stage tank can be monitored for other parameters in the on site lab using established and common process monitoring methods.

Figure 6:
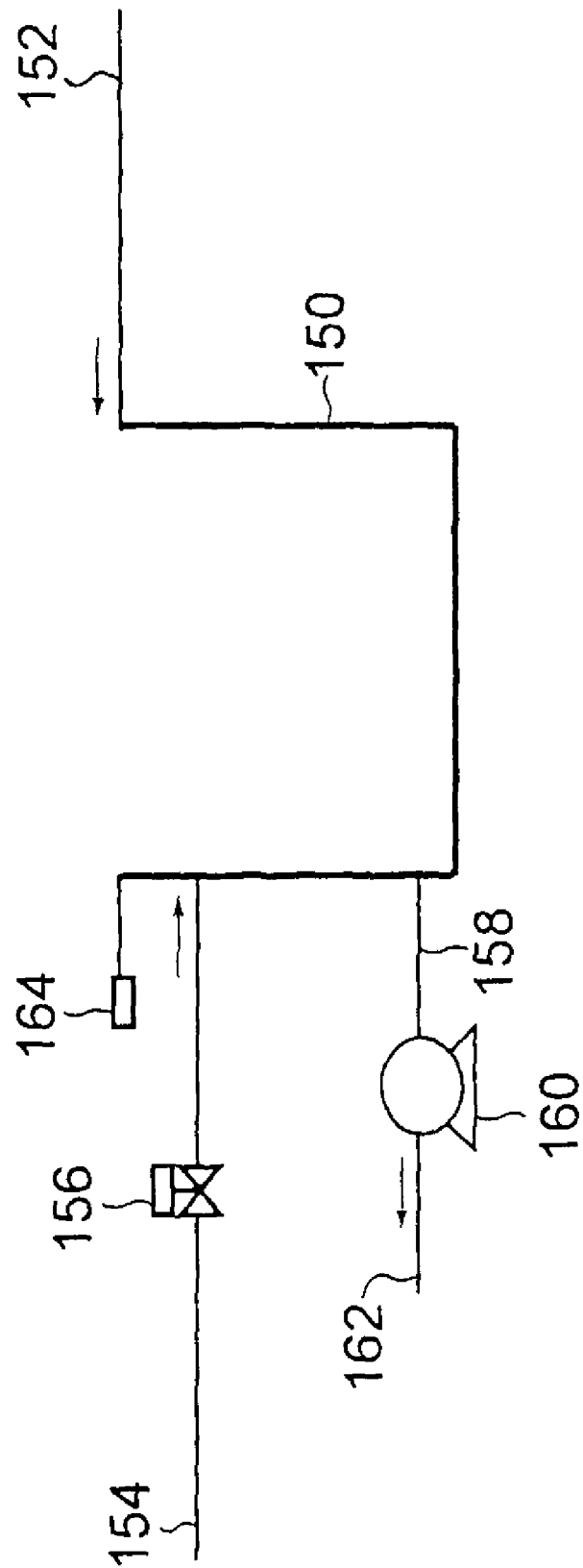
FIG. 6 is a schematic diagram of a salt saturator vessel, for use in conjunction with the process of the present invention.

FIG. 6 depicts a salt saturator vessel (150), which is fitted with a salt inlet line (152) and water line (154). The water inlet line is fitted with a valve (156). A discharge line is fitted to the base of the vessel (158) and the saturated salt solution is pumped via (160) to the second regeneration stage through regenerant line (162). The saturated salt solution is prepared by delivering a quantity of salt via (152) to the vessel to form a salt bed at the base of the vessel. Water is added via (154) to maintain a desired level (164).

Figure 7:
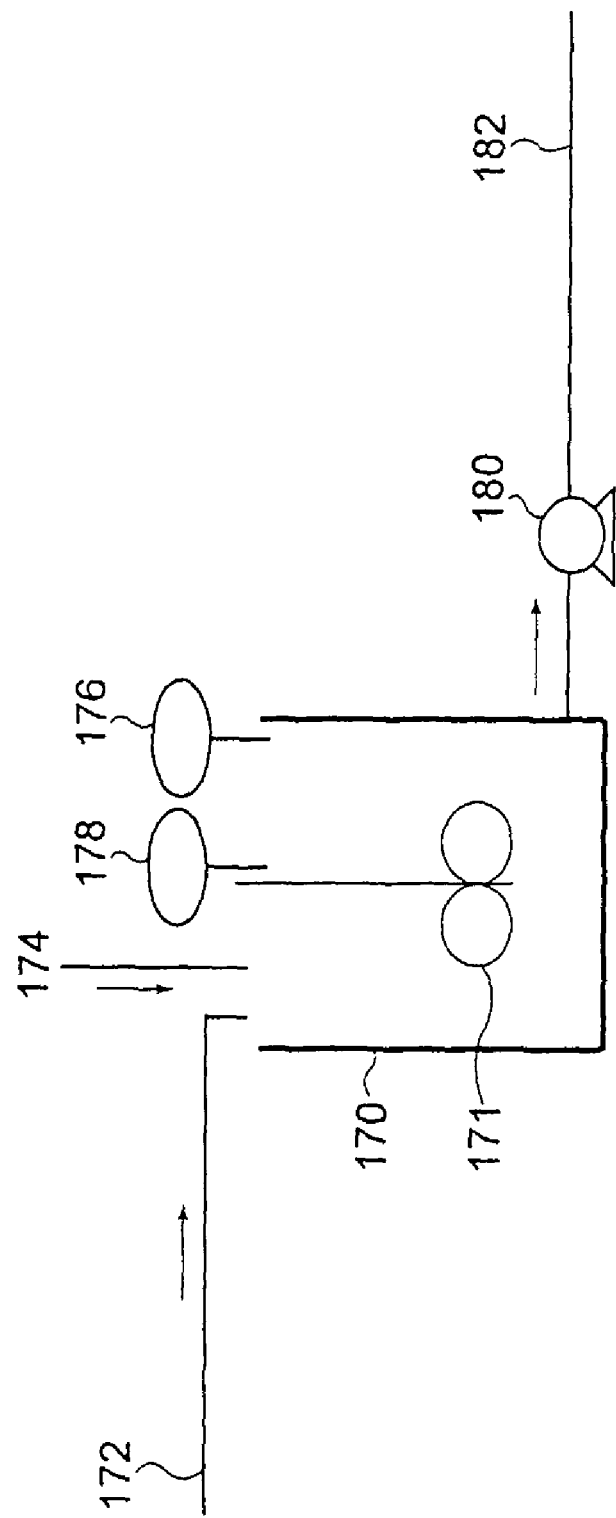
FIG. 7 is a schematic diagram of a regeneration vessel, which can be used in the process of the present invention.

FIG. 7 depicts a regeneration vessel (170) fitted with a mechanical stirrer (171). The vessel is filled with resin from the stage one regeneration step via a supply line (172). Regenerant which overflows from stage one regeneration is supplied to (170) via line (174). The level of regenerant/resin in the tank is electronically monitored and regulated with sensor (176) together with the regenerant concentration via an appropriately positioned conductivity meter (178). The resin/regenerant is discharged from the base of the vessel and pumped via (180) to second stage regeneration via supply line (182).

Figure 8A:
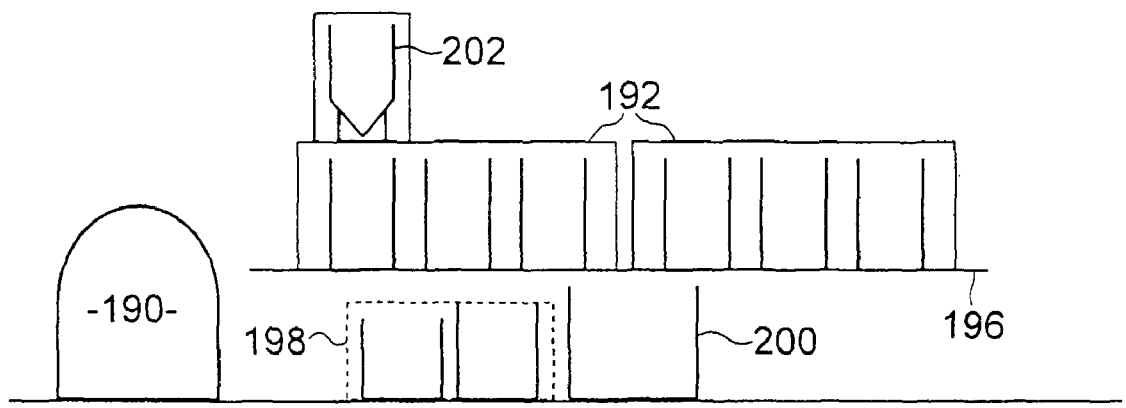
FIGS. 8a and 8b are schematic diagrams respectively showing side and end elevations of an arrangement of apparatus for use in the process of the present invention.
Figure 8B:
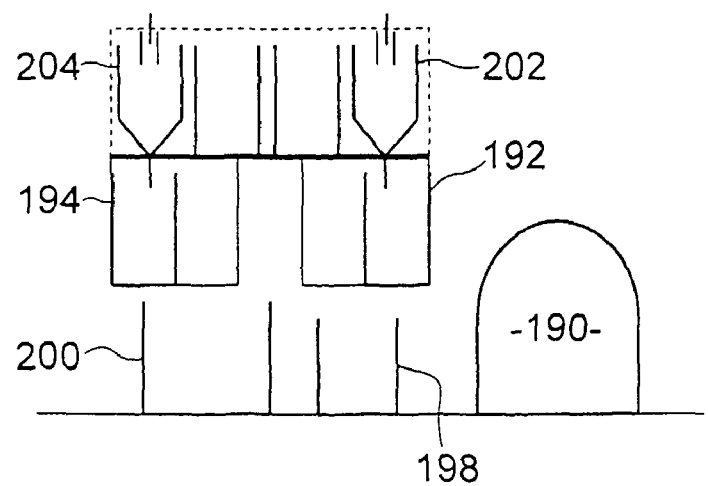

FIGS. 8*a* and 8*b* depicts a preferred orientation (side and end elevations) of the equipment which comprises a preferred regenerant system of the present invention. The system comprises twelve regeneration vessels, six for the first stage (192) and six for the third stage (194), (as shown only the end third stage vessel is visible in the end elevation). The combined length of these vessels when connected does not generally exceed 40 ft. These vessels are positioned on a platform (196) above a fresh resin storage facility (198) and a soak/regeneration vessel (200). Above (192) and (194) is positioned resin transfer tanks for the first regeneration stage (202) and the third regeneration stage (204). The total combined height of this three level orientation is preferably no more than 25 ft (7650 mm). The system is also fitted with a salt saturator (190).

Figure 9:
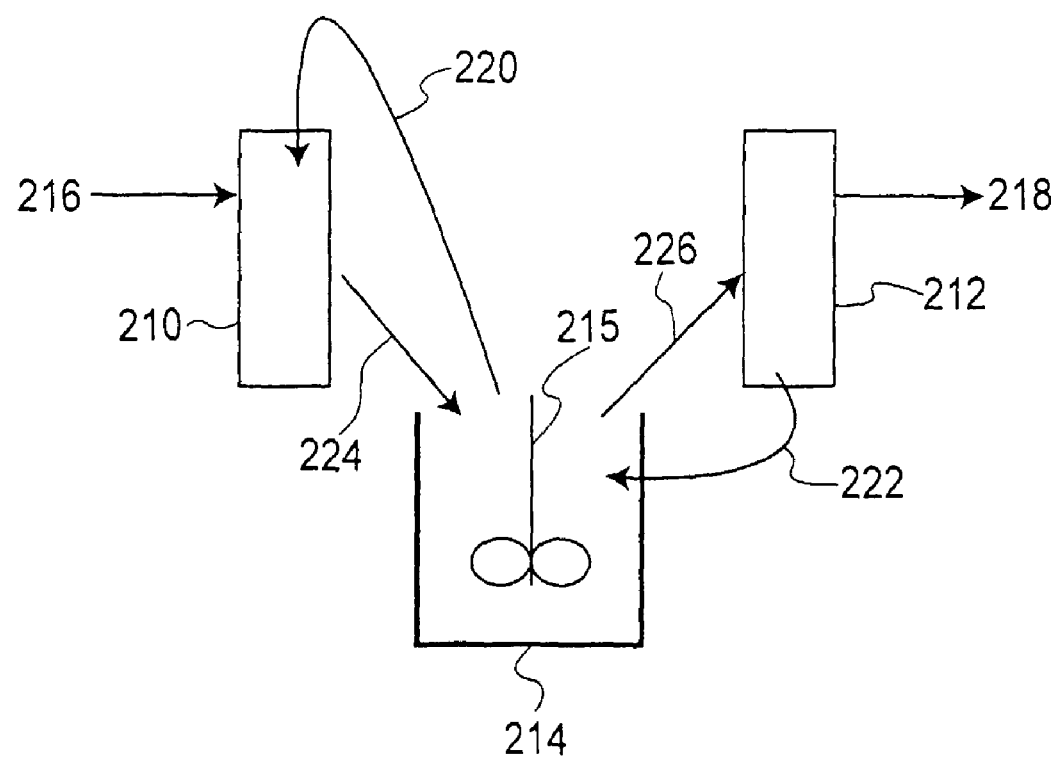
FIG. 9 is a schematic diagram of a regeneration process of the present invention in accordance with example 2.
Figure 10:
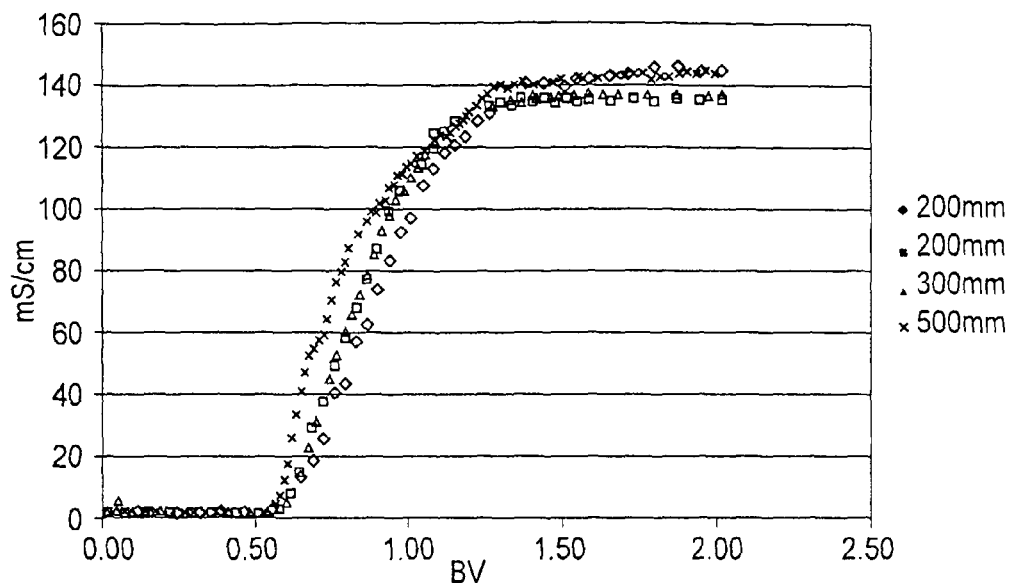
FIG. 10 is a graph of conductivity (ms/cm) against the number of bed volumes (BV) of regenerant drained through various resin bed heights. Four sets of results are shown depicting 200 mm (diamond), 200 mm (square), 300 mm (triangle) and 500 mm (X) runs.
Figure 11:
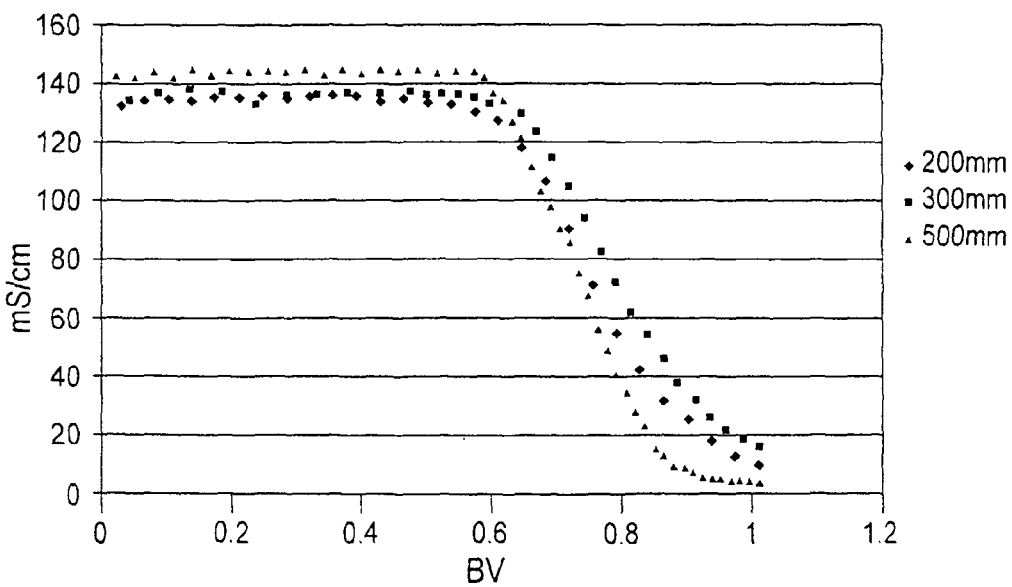
FIG. 11 is a graph of conductivity (ms/cm) against the number of bed volumes of rinse water drained through various resin bed heights. Three sets of results are shown depicting 200 mm (diamond), 300 mm (square) and 500 mm (triangle) runs.
Figure 12:
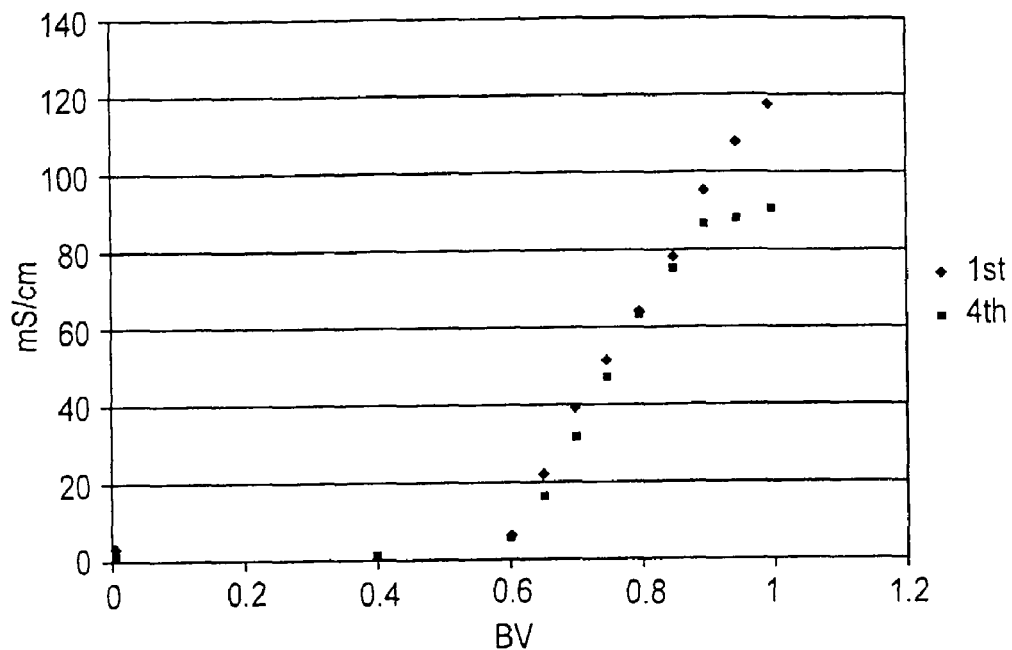
FIG. 12 is a graph of conductivity (ms/cm) against the number of bed volumes (BV) of regenerant leaving the column after $1^{st}$ (diamond) and $4^{th}$ (square) regeneration.
Figure 13:
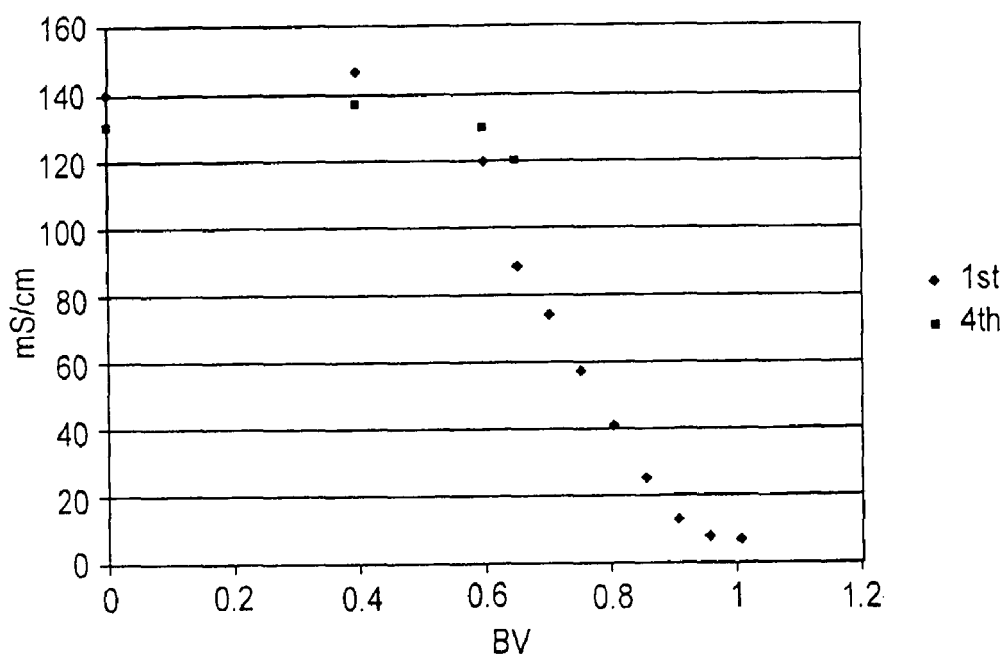
FIG. 13 is a graph of conductivity (ms/cm) against the number of bed volumes of rinse water leaving the column after $1^{st}$ (diamond) and $4^{th}$ (square) regeneration.
Figure 14:
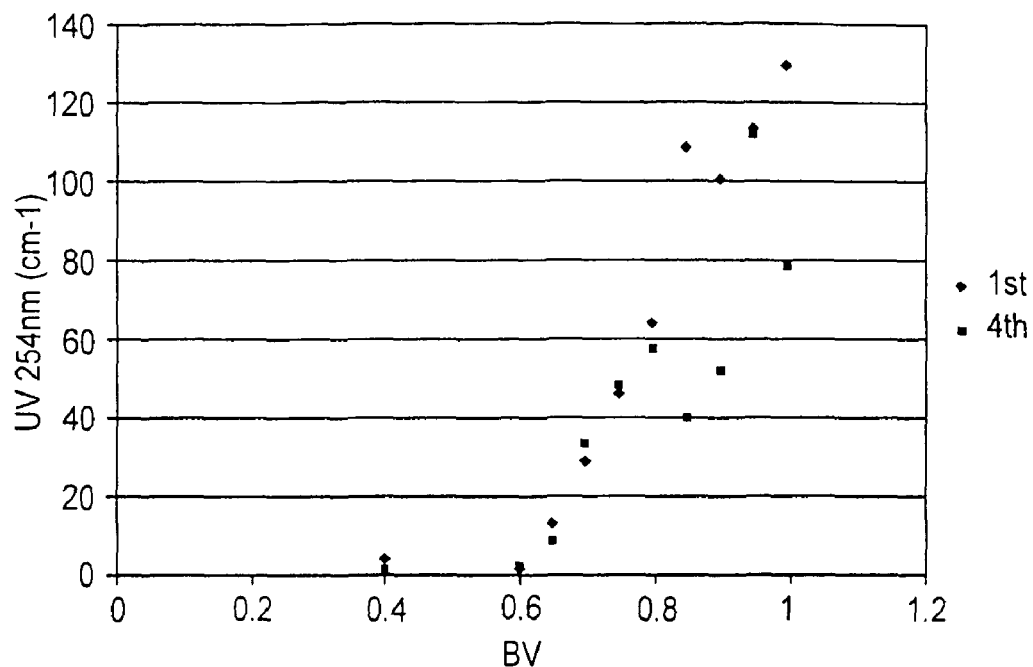
FIG. 14 is a graph of UV absorbance at 254 nm ($cm^{-1}$) against bed volumes (BV) of regenerant after $1^{st}$ (diamond) and $4^{th}$ (square) regeneration.
Figure 15:
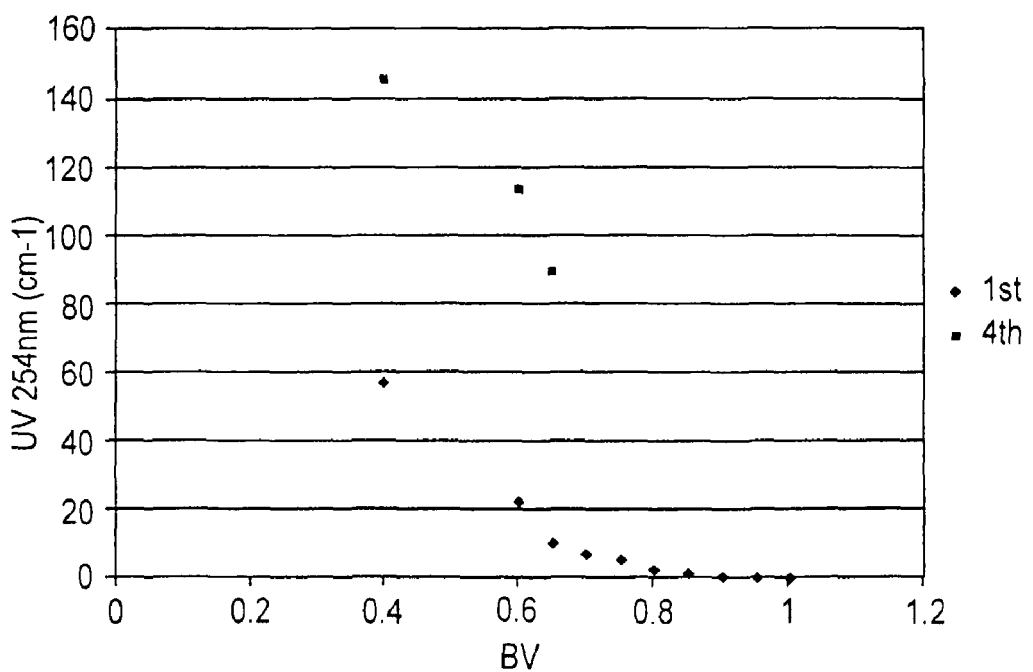
FIG. 15 is a graph of UV absorbance at 254 nm ($cm^{-1}$) against bed volumes (BV) of rinse water after $1^{st}$ (diamond) and $4^{th}$ (square) regeneration.
Figure 16:
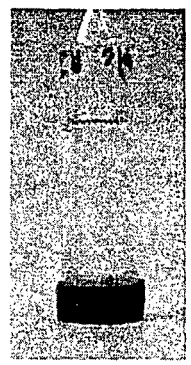
FIGS. 16a and 16b are photographs of samples of end regenerant from the stage one regeneration vessel 210 and the rinse water from the stage three vessel 212.
Figure 16:
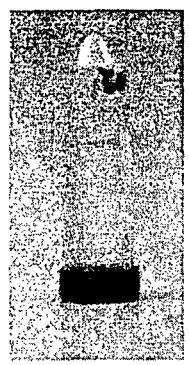
Figure 16:
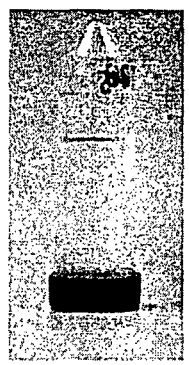
Figure 16:
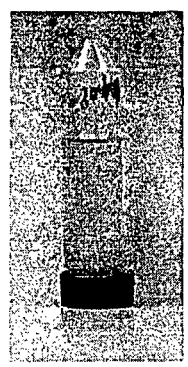
Figure 16:
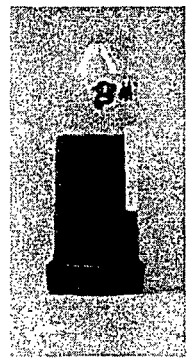
Figure 16:
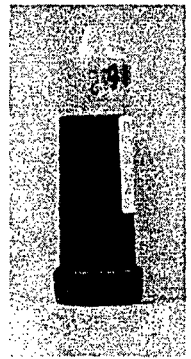
Figure 16:
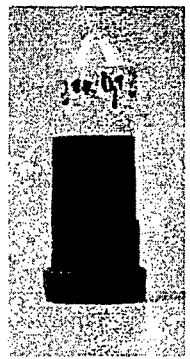
Figure 16:
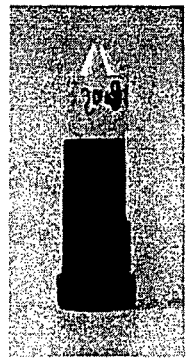
Figure 16:
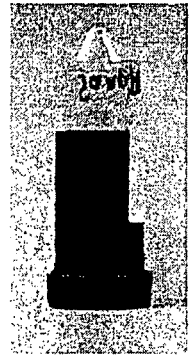
Figure 16:
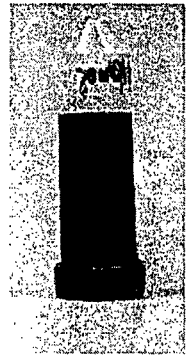
Figure 16B:
Figure 16B:
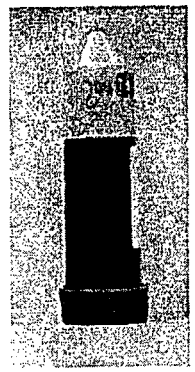
Figure 16B:
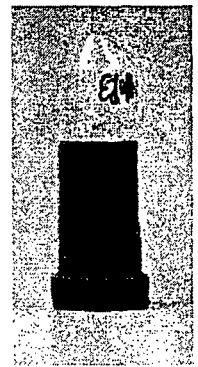
Figure 16B:
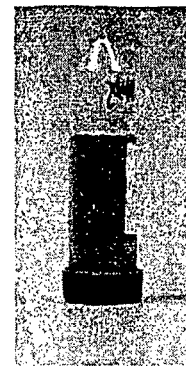
Figure 16B:
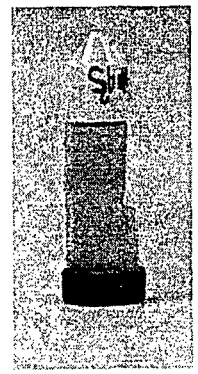
Figure 16B:
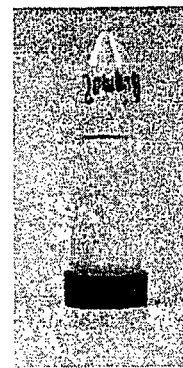
Figure 16B:
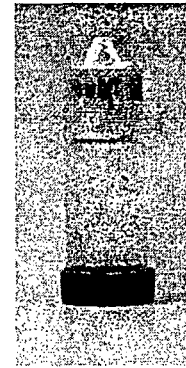

FIG. 9 depicts the regeneration process system which is referred to in example 2. The system comprises two tall, cylindrical regeneration columns (210), (212) and one agitating mixing tank (214), the agitator is shown as (215). The resin is supplied to (210) via (216) and exits the system via (218). The regenerant from (214) is transferred via (220) to (210), while the regenerant from (212) is transferred via (222) to (214). Resin is moved from column (210) into tank (214) via (224) and into column (212) via (226).

The following examples are provided to assist in the further understanding of the invention of the earlier figures. Particular materials, and conditions employed are intended to be illustrative of the invention and not included to limit the scope thereof.

EXAMPLES

Example 1

Modular Package

A modular package incorporating the equipment necessary to self-install a regeneration system according to the present invention includes components for the set up of the first and third regeneration stages (regeneration modules) and an optional soaking storage tank (soaking module).

The components which make up each of the first and third regeneration stage modules include six regeneration vessels. Suitable vessels include for instance those supplied by Nylex having a volume of 2.25 m$^2$, length of 1800 mm and height of 1900 mm. Other components include 6 regeneration mixers. Suitable mixers are low shear impeller mixers such as those supplied under model type Mixtec HA715 or Lightnin A310. Additional components for the first and second regeneration stages include 2 conductivity meters, for example those supplied under the model type Yokogawa Electrodeless-toroidal (0 to 200 mS/cm), one pressure regulator, 20 George Fisher actuated valves, 20 George Fisher manual valves, 6 Solenoid valves (preferably 25 mm), and 6 regeneration pumps, (preferably air operated diaphragm valves).

The optional soaking storage tank module may comprise 1 regeneration tank. A suitable vessel may include, for instance, a tank supplied by Nylex having a volume of 17 m$^2$, length of 2750 mm and height of 3500 mm. The module may also contain a mixer and a resin pump, for instance a LSH pump supplied by Pump Technology. This module may also contain a conductivity meter, for example those supplied under the model type Yokogawa Electrodeless-toroidal (0 to 200 mS/cm), as well as level meter (Vega-Radar).

Other components to the modular package include 2 transfer vessels and a fresh resin tank. Suitable vessels are those supplied by Nylex (square section) preferably with a volume of 2.25 m$^2$, length of 1500 mm, height of 2000 mm and width of 1500 mm. The modular package may also come with 2 brine storage tanks. Suitable tanks are those supplied by Nylex (circular) preferably with a volume of 2.25 m$^2$, diameter of 1460 mm and height of 1900 mm. A fresh brine tank may also be supplied. Suitable tanks are those supplied by Nylex (circular) having a volume of 2.25 m$^2$, diameter of 1460 mm and height of 1900 mm. Other components may include a conductivity meter for the fresh brine tank (Yokogawa Electrodeless-toroidal (0 to 200 mS/cm)). Also included may be a levelling meter for the fresh brine tank.

The modular package may also comprise a salt saturator, pumps for the first stage regenerant, fresh regenerant supply, and fresh resin pump. Such pumps are preferably constant pressure pumps derived from Onga/Grundfos.

Example 2

Regeneration Trial Process

Resin was regenerated using two tall, cylindrical regeneration columns (210) and (212) and one agitated mixing tank (214) as shown in FIG. 9. The regeneration process is described. The procedure was completed initially to obtain conductivity curves against bed volume of regenerant and rinse water pulled through the columns (210) and (212). These curves are depicted in the graphs designated FIGS. 10 to 16 and were used to determine the initial operating procedures described below. Once the procedure and operating parameters were decided, operation commenced and the conductivity and UV were measured for the first and fourth regeneration. Once these curves were obtained (FIGS. 10 to 16) the method was modified and samples were once again taken.

a) Initial Procedure

The resin to be regenerated is allowed to build up in column 210 over a four-hour period, aiming for 2100 ml of settled resin each four-hour period. This is just above the 300 mm level in the column. Initially tank 214 contained 3 L of resin with 9 L of fresh brine at a salt concentration of 120 g/L. From here 1-2 BV (Bed Volumes) of brine was transferred to column 210. This was pulled through the column at a flowrate of 116 ml/min to obtain a plug flow with a superficial velocity of 1 m/hr through the resin bed. The first 0.6 BV was returned to the contactors. The next 0.4 BV was sent to waste. This is the only waste stream from the regeneration process. 1 BV of resin was removed from tank 214 by mixing into a homogenous solution and pumping into column 210. At the same time the drain was left open and the brine is drained and collected before being returned to tank 214. Pulling the brine through the bed effectively acted as an extra regeneration step. Resin from column 210 is then transferred to tank 214 with the remaining brine by opening drain point and allowing the resin to slide out (shown by flow line 224). 0.4 BV of fresh brine with a salt concentration of 120 g/L is added to column 212. This is pumped out of the column at 116 ml/min and sent to tank 214 (shown by flow line 226). 1-2 BV of water is then added to column 212. 0.6 BV is pulled through and sent to tank 214. The remaining water is mixed with the resin and added to the fresh resin tank (FRT). The appropriate amount of water is then added to the FRT to bring vessel to the desired level to obtain a concentration of 80 ml/L of settled resin.

b) Modified Procedure

The resin to be regenerated is allowed to build up in column 210 over a four-hour period, aiming for 2100 ml of settled resin each four-hour period. This is just above the 300 mm level in the column. Initially tank 214 contained 4 L of resin with 12 L of fresh brine at a salt concentration of 170 g/L. From here 1-2 BV of brine was transferred to column 210. This was pulled through the column at a flowrate of 116 ml/min to obtain a plug flow with a superficial velocity of 1 m/hr through the resin bed. The first 0.8 BV was returned to the contactors. The next 0.4 BV was sent to waste. This is the only waste stream from the regeneration process. 1 BV of resin was removed from tank 214 by mixing into a homogenous solution and pumping into column 212. At the same time the drain is left open and the brine is drained into a bucket before being returned to tank 214. Pulling the brine through the bed effectively acts as an extra regeneration step. Resin from column 210 is then transferred to tank 214 with the remaining brine by opening drain point and allowing the resin to slide out. 0.3 BV of fresh brine with a salt concentration of 170 g/L is added to column 212. This is pumped out of the column at 116 ml/min and sent to tank 214. 1-2 BV of water is then added to column 212. 0.9 BV is pulled through and sent to tank 214. The remaining water is mixed with the resin and added to the fresh resin tank (FRT). The appropriate amount of water is then added to the FRT to bring vessel to the desired level to obtain a concentration of 80 ml/L of settled resin.

TABLE 1

The table below presents a summary of the plant performance results obtained from a previous trial incorporating the conventional regeneration process and compares it with the results obtained during this trial which utilised the G2 regeneration process.

| Pilot Plant Setup 15 ml/litre and 5% regen rate | Average UV 254 nm removal from raw water | Salt usage kg/ML | Brine Waste from Process L/ML | Rinse Water Waste from Process L/ML |
|---|---|---|---|---|
| Conventional Typical Performance 8 brine uses | 65 to 70% | 109 | 550 | 320 |
| Typical performance using the regeneration process of example 1 | 69% | 41 | 320 | 0 |

A number of variations and improvements can be made to the earlier described system, and the present invention also includes those changes.

Figure 17:
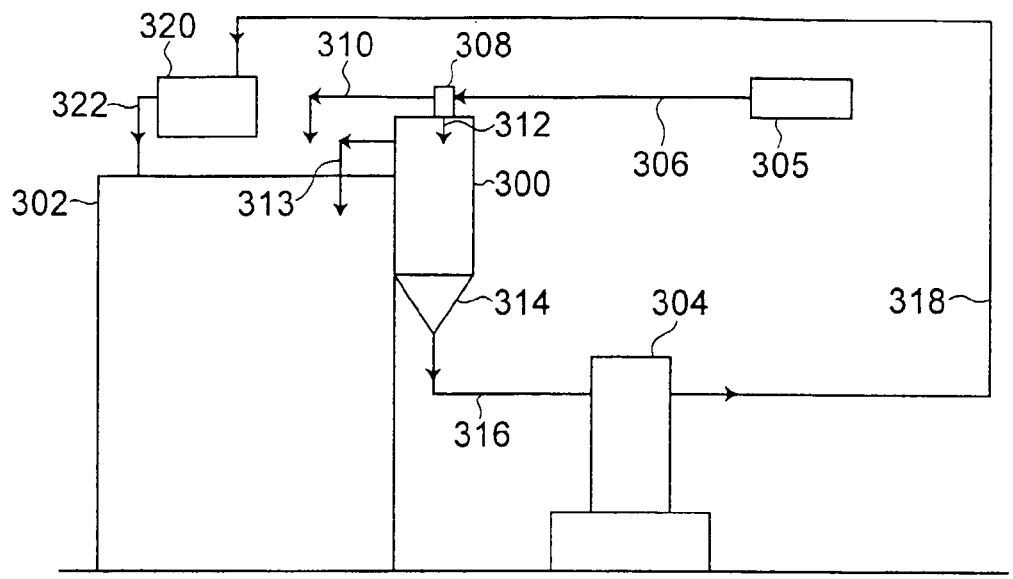
FIG. 17 is a schematic diagram of the layout of a transfer vessel, contactor, and regeneration vessel assembly.
Figure 18:
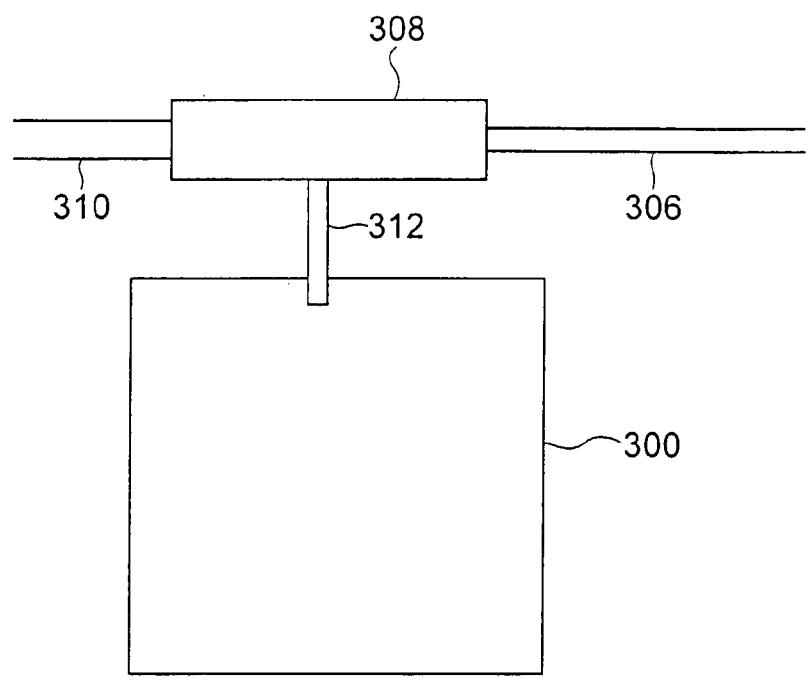
FIG. 18 is a schematic diagram of a splitter box and transfer vessel arrangement.

FIGS. 17 and 18 depict the layout of a transfer vessel and splitter box system and the attachment arrangement with a contactor. The layout is an example of how the transfer vessel and splitter box system could be installed. This arrangement permits the use of standardised equipment with a wide range of contactors.

The transfer tank 300 is attached to the side of the contactor 302 and is located above the regeneration system(s) 304 so that resin can gravity feed into the tanks of the regeneration system. Collected resin, such as recycled resin from settling tanks 305, passes along pipe 306 in the direction of the arrow. The resin passes into a splitter box 308, located on the top of the transfer tank 300. The splitter box 308 diverts a desired percentage of the flow, typically 10%, by the use of a gate (not shown) within the box and allows the remainder (90%) to pass via pipe 310 into the contactor 302 completing the return cycle to the contactor of that resin. The flow of diverted resin passes through pipe 312 into the transfer tank 300. The tank 300 concentrates the resin by allowing the excess water to pass over the side of the tank into the contactor 302 (overflow shown by line 313). The resin concentrates within the tank and settles towards the bottom portion 314 of the tank, which is shaped to direct the resin into a transfer pipe 316. The resin flows along the pipe into a regeneration vessel of the regeneration system 304. Once regenerated the resin passes along pipe 318 into a resin storage tank (not shown) for return to the contactor 302. The resin storage tank is normally located above the contactor so that the resin can be gravity fed into the contactor. The placement of the storage tank above the contactor allows resin overflow to also feed into the contactors.

This arrangement reduces the need to use sensors or flow controllers when concentrating resin for subsequent regeneration.

The variability of the height of contactors in plants can make the use of standardised equipment difficult. However, the above arrangement should work with most water treatment plants because it involves locating and attaching the transfer tank 300 to the side of the contactor 302. It should function independent of the height of the contactor tank as the base of the transfer tank will vary with overall contactor height and will allow a standardised transfer tank design to be used as part of the regeneration facility.

The suitable transfer tank is a 1 m by 1 m square section tank with a 70° internal angle hopper base. The overall height of the transfer tank is governed by the height of the contactors. An alternative tested transfer tank was circular with a 90° internal angle base cone. The diameter can be reduced to 600 mm (a pipe section) in smaller water plants if required, and additional transfer tanks of the same type can be added for larger systems.

The splitter box 308 is an open channel with an adjustable "gate" (not shown) set to divert a portion of the recycle flow to the transfer tank. The splitter box can be located to the side of the transfer tank at enough height to allow resin slurry to flow into the transfer tank 300.

The regenerated (fresh) resin is pumped along the regenerated resin return pipe 318 into a fresh resin storage tank 320. The fresh resin storage tank is used to provide a buffer for the addition of fresh resin. Regenerated resin is pumped from the regeneration tanks to the fresh resin tank which is sized to hold at least a single batch of fresh resin (one regeneration tank volume). The use of a hopper style tank allows the entire contents to be discharged without the need for a mixer. A continuous water bleed can be passed through the fresh resin pumps which will act as a water flush for the fresh resin hopper, and should avoid system blockages.

The fresh resin is discharged from the fresh resin storage tank 320 into the contactors 302 via discharge pipe 322. The rate of discharge from the fresh resin storage tank can be controlled using a manual valve or a timed automatic valve to limit fast discharges of fresh resin to the contactors.

Figure 19:
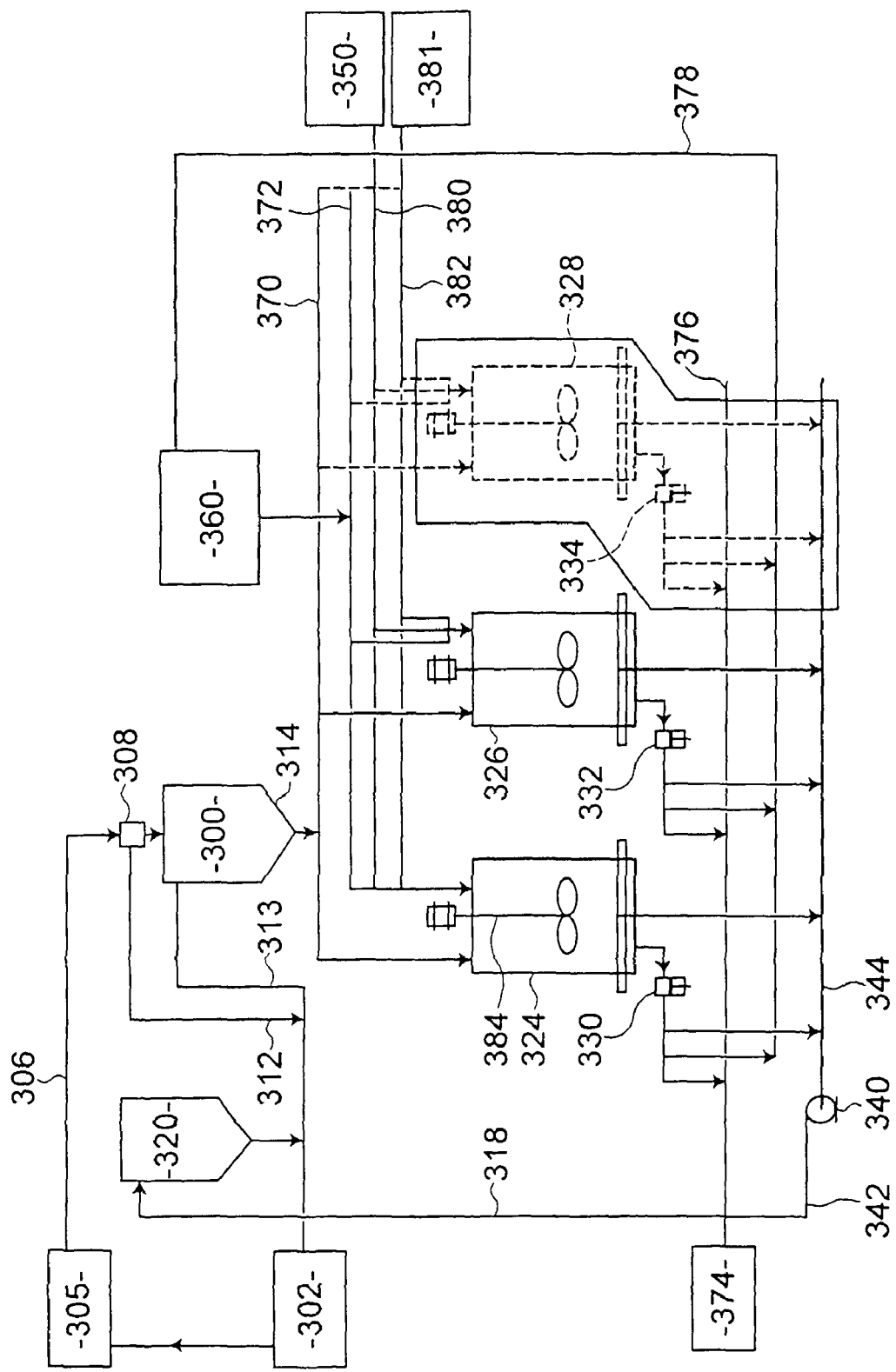
FIG. 19 is a schematic diagram depicting a regeneration process of the present invention using multi-function regeneration vessels.

FIG. 19 depicts an alternative regeneration system incorporating the above improvements and other modifications, discussed in more detail below. Instead of a 3 stage system with specialised vessels the regeneration process of the alternative design is carried out in a multi-function regeneration vessel. The vessel is connected to a manifold system for use with other multi-function regeneration vessels.

While the three-stage system derived efficiencies from specialised tanks and using a second stage "soak" tank, this alternative system may provide other benefits. The alternative system includes the following equipment.

A. Resin Transfer Tank 300

This operates as described above and accumulates and concentrates exhausted resin for supply to the regeneration tanks. As depicted in FIG. 19 the exhausted resin may be sourced from the contactor return feed from settlers. However, if a settler system is not required, such as in a column system, then the exhausted resin could be provided by a dedicated exhausted resin feed system.

B. Fresh Resin Tank 320

As described earlier, this is a simple hopper tank which provides a buffer for fresh resin transfer from the regeneration tanks 324, 326 to the contactors 302. The fresh resin hopper is located above the contactors connected to the wall of the contactors. In some instances, the fresh resin tank can be eliminated and the regeneration tanks discharge directly into the contactors 302.

C. Regeneration Tanks 324, 326

These are multi-function regeneration vessels as earlier described. Each tank is equipped with a separate vacuum drain pump 330, 332 and other equipment to enable the tank to be installed on a manifold system. The tanks have a standardised design and are available in two sizes depending on plant capacity. The two sizes are 600 mm (2 ft) and 1200 mm (4 ft). The tanks are square with a resin bed height set at 600 mm (2 ft). The design of the tanks and other equipment is standardised so that a number of identical tanks can be assembled on a common manifold system and additional tanks added as required (eg tank 334).

The number and size of the regeneration tanks required depends on the resin volume to be processed.

The table below sets out the estimated number of regeneration tanks for a plant capacity (MGD).

TABLE 2

Regeneration tank model, number and plant capacity

| Model Number | Number of tanks | Resin capacity gpd | Nominal plant capacity Millions Gallons per Dday (MGD) | Design margin on cycle time |
|---|---|---|---|---|
| R600 | 2 | 918 | 0.9 | 10% |
|  | 4 | 1835 | 1.7 | 10% |
|  | 6 | 2753 | 2.6 | 10% |
|  | 8 | 3365 | 3.1 | 20% |
|  | 12 | 5047 | 4.7 | 20% |
| R1200 | 2 | 3337 | 3 | 10% |
|  | 4 | 6673 | 6 | 10% |
|  | 6 | 10010 | 9 | 10% |
|  | 8 | 12234 | 11 | 20% |
|  | 12 | 18351 | 17 | 20% |

R600 dimensions are 600 mm by 600 mm by 1800 mm tall

R1200 dimensions are 1200 mm by 1200 mm by 1800 mm tall

The resin volumes are based on a resin concentration of 20 ml/L and a regeneration rate of 5%.

For example, from the above table—a 5 MGD plant at 20 ml/L and 5% regeneration rate could use 12 R600 model tanks or 3 R1200 tanks.

The above table is an approximate guide. The assumptions described in Table 3 below have an impact on the cycle time hence resin regeneration rates.

TABLE 3

System Design assumptions

| Parameter | R600 | R1200 |
|---|---|---|
| Settled resin bed height in regeneration tank | 2 ft (600 mm) | 2 (600 mm) |
| Superficial velocity through tank during draining | 0.63 gpm/ft$^2$ 1.5 m/hr | 0.63 gpm/ft$^2$ 1.5 m/hr |
| Bed volume of regenerant diverted to waste | 0.4 | 0.4 |
| Bed volume of regenerant added | 1.5 | 1.5 |
| Bed volume of water added | 1.5 | 1.5 |
| Bed volume of fresh brine added | 0.3 | 0.3 |
| Tank inlet manifold rates | 22 gpm 5 m$^3$/hr | 44 gpm 10 m$^3$/hr |
| Design cycle time | 162 minutes | 180 minutes |
| Design margin (2 to 6 tanks) | 10% | 10% |
| Design margin (8 to 12 tanks) | 20% | 20% |
| Tank capacity - resin regenerated per day | 1.6 m3 per day 422 gpd | 5.8 m$^3$per day 1480 gpd |

D. The Regenerant System

The regenerant system includes a salt saturator with a saturated brine pump (not depicted) which supplies saturated brine to a fresh brine tank 350. The fresh brine tank is a small tank which receives water and saturated brine to make fresh (third stage) regenerant to the desired concentration.

The fresh brine tank receives saturated brine and water in set volumes to obtain a required NaCl concentration. The volume of fresh regenerant required for each regeneration is small, and can be about 0.3 bed volumes. Accordingly, the fresh brine tank may be a small tank sufficient to contain 0.3 bed volumes together with volume to fill the delivery pipe at all times.

The volume of the regenerant discharged from the tank brine can be controlled by a flow level instrument.

The regenerant system also includes a large regenerant tank 360 for storing the first stage regenerant. The fresh brine tank can be located inside the regenerant tank or be attached to the side wall of the regenerant tank. The fresh brine tank can be made of welded plastic sheets or be a ready made tank. It is advantageous to locate the fresh brine tank within the regenerant tank as brine would be contained within the regenerant tank in the event of a water valve or level instrument failure in relation to the fresh brine tank.

The fresh brine volume required for a R1200 tank based on 0.4 Bed Volumes of fresh brine required is 350 L. For the R600 model the fresh brine volume requirement is 100 L.

These small volumes can be added by first adding the water volume based on level rise in the tank followed by the saturated brine volume based on level rise in the tank.

The regenerant tank receives the regenerant from the regeneration vessel 324 and 326 (and any additional vessels such as 328) and will supply regenerant by gravity back to the regeneration vessels.

Although it is expected that the inlet flow total will equal the outlet flow total, there may be occasions when the inlet and outlet flow rates are not be equal. Level indicators are used for flow management purposes.

The quality of the regenerant in the tank is monitored by the use of a conductivity probe fitted to the tank.

The size of the regenerant tank will depend on the volume of the regeneration vessels. Conveniently volume of the tank is around 10% of the total daily turnover. In an arrangement the tank may be have an internal fresh brine tank.

The following table suggested sizes of regenerant tanks for three different plant capacities. The dimensions are presented as a guide only.

TABLE 4

Suggested size of regenerant tanks

| | Plant Capacity MGD (water production) | | |
|---|---|---|---|
| | 2 (R600) | 5 (R600) | 15 (R1200) |
| Number of regeneration tanks | 6 | 12 | 12 |
| Regenerant turnover/day | 28 m³ / 7400 Gal | 57 m³ / 15000 Gal | 207 m³ / 52840 Gal |
| Regenerant tank volume | 3 m³ / 740 Gal | 6 m³ / 1500 Gal | 20.7 m³ / 5824 Gal |
| Diameter | 1.1 m | 1.6 m | 2.6 m |
| Height | 3 m | 3 m | 4 m |

It is preferred to use a tall/narrow tank as opposed to a short/wide tank because the regenerant tank will operate at a top fluid level.

E. Fresh Resin Pump System

The system is equipped with two resin pumps (depicted as the single pump 340) to allow the process to continue operating at a reduced transfer rate in the event of a pump failure. Each pump should have its own discharge line (depicted as the single pipe 342) to avoid one pump from being able to "overpower" the other. Each pump handles 50% of the system capacity.

The fresh resin pumps are connected to a common resin discharge pipe 344 from the regeneration tanks. The system is envisaged to operate with only a single tank to be discharging at one time. The resin transfer time may be 10 minutes out of an estimated total cycle time of approximately 200 minutes. This avoids the need to provide multiple designs to cater for a range of flows. It is believed that this arrangement will not significantly increase overall cycle times as resin transfer is a small fraction of the total regeneration cycle time. Of course the size of the discharge could be increased if it is expected to have multiple tanks discharging resin at the same time.

The discharge pipe is continuously flushed with a low volumetric rate of water (eg 10-20% of full pump flow). This allows the pumps to operate continuously with no frequent starts, should ensure that resin does not form blockages in the transfer pipes during down time and flushes the base of the fresh resin tank which should prevent blockages in that tank.

The water flush supply is supplied from a common water system with a pressure regulator and manual valve to adjust the flow rate. The suction pipe has a flow switch and/or flow meter to warn the operator of a water supply failure.

The common regenerant drain discharge manifold should be sized to cope with 50% of the tanks using the common outlet at any one time. This assumes a regeneration tank will be draining regenerant for approximately 50% of the total regeneration cycle time.

Suggested equipment and pipe sizes for R600 and R1200 regeneration tanks are presented on the following table.

TABLE 5

Pipe and equipment sizes for regeneration tanks

| | R600 Pipe diameter (mm) | R1200 Pipe diameter (mm) | Comments |
|---|---|---|---|
| Loaded resin inlet pipe | 25 | 50 | Gravity flow |
| Regenerant inlet pipe | 25 | 50 | Gravity flow |
| Fresh brine pipe | 25 | 50 | Gravity flow |
| Process water pipe | 25 | 50 | Pressure regulated |
| Drain pipe (to waste) | 25 | 25 | Pumped |
| Drain pipe (to contactors) | 25 | 25 | Pumped |
| Drain pipe (to regenerant tank) | 25 | 25 | Pumped |
| Fresh resin discharge pipe | 40 | 80 | Pumped |
| water flush pipe | 25 | 25 | Pressure regulated |

It is expected that the overall fresh resin transfer rate can remain the same regardless of the number of regeneration tanks installed in the regeneration facility. This allows the use of the same design for the fresh resin transfer system for each size of regeneration tanks.

The system can be fitted with additional regeneration vessels to cope with increased resin volumes. Regeneration vessel 328 is an example of an additional vessel when connected to the existing manifold. The interval between fresh resin transfers to the fresh resin tank will decrease as the number of regeneration vessels connected to the manifold is increased.

For example, if 6 R600 tanks are used (for a 2 MGD plant) the estimated time between transfers is 25 minutes. However, if 12 R600 tanks are used (for a 5 MGD plant) then the time decreases to 8 minutes. The only difference between to the fresh resin systems is the time available to discharge the fresh resin from the fresh resin tank. The table below summarises the relevant parameters for a R600 and R1200 fresh resin system.

TABLE 6

Comparison of R600 and R1200 system parameters

| | R600 | | R1200 | |
|---|---|---|---|---|
| Number of tanks | 6 | 12 | 6 | 12 |
| Fresh resin transfer rate m³/hr (gpm) | 5 (22) | 5 (22) | 25 (110) | 25 (110) |
| Transfer volume L (Gal) | 650 (171) | 650 (171) | 2600 (686) | 2600 (686) |
| Time between transfers (mins) | 25 | 8 | 30 | 12 |
| Fresh resin tank volume L (Gal) | 800 | 800 | 2700 | 2700 |
| Length | 1 m | 1 m | 1.5 m | 1.5 m |
| Width | 1 m | 1 m | 1.5 m | 1.5 m |
| Base angle | 90 | 90 | 90 | 90 |
| Height total | 1.5 m | 1.5 m | 2.25 m | 2.25 m |

In operation resin is collected from an underflow settler 305. The resin is transported via pipe 306 to the splitter box 308 where a portion of the flow (approximately 10%) is passes into the concentrator 300 via pipe 312. The remainder of the flow is returned via pipe 310 to the contactors 302. The overflow from the concentrator is also returned to the contactors 302 by pipe 313.

Concentrated resin is transferred from the bottom of concentrator to an empty regeneration vessel 324 or 326, in response to a signal from a sensor associated with the vessel. The resin is transferred via pipe 318 to a common manifold 370 connected to all vessels.

Control valves operate in response the vessel sensors to allow the resin to pass into an empty vessel.

The resin is then subjected to the regeneration process as earlier described. Excess water is first drained from the vessel and is returned to the contactors via the fresh resin manifold 344. The vacuum pump associated with the vessel 330, 332 will quickly drain the excess water.

Regenerant (brine) is then added to the vessel from the regenerant tank 360 via the regenerant manifold 372.

The regenerant is drained off by the associated vacuum pump. The first fraction (approximately 0.3 bed volumes) containing the highest concentration of DOC is sent to the waste drain 374 via the waste drain manifold 376. The remainder is returned to the regenerant tank via the brine drain manifold 378.

As the regenerant is drained a concentrated solution of brine is added the vessel in a plug flow manner. This brine is obtained from the fresh brine tank 350 via the fresh brine manifold 380 and may be a saturated brine solution or may have been further diluted. This solution is followed by fresh water 381 piped into the vessel via the fresh water manifold 382. The fresh water is used to rinse the resin.

The concentrated solution of brine is drained off by the vacuum pump associated with the vessel. This solution is also sent to the fresh brine tank 350 via the fresh brine manifold. A conductivity sensor detects when fresh water is being pumped from the vessel. Once the sensor detects the fresh water the resin is pumped from the vessel to the fresh resin tank 320 via the fresh resin pumps 340 and the fresh resin manifold 344. The stirrer 384 may be used to fluidise the resin to facilitate the transfer of the resin from the vessel to the tank.

In effect the vacuum pump operates continuously as resin is added to the vessel, firstly drawing off water, then regenerant (the first fraction being sent to waste), then concentrated regenerant and finally the rinse water.

Waste and Salt Consumption Volumes

One of the benefits of the present invention is that the regeneration system has a constant regenerant/DOC waste discharge in each regeneration. In contrast, more conventional designs use a brine/DOC waste purge every use and a whole discharge after a number of uses (eg. after 10 regenerations).

Test trials indicated that the expected waste volume per regeneration for the present invention will be in the order of 0.20-0.25 bed volumes (BV) of resin. Accordingly, 0.20-0.25 gal of waste brine/DOC will be generate for every gallon of resin regenerated.

For a 10-MGD design and with operating conditions of 25 mL/L and 5% regeneration rate, the expected waste volume generated is:

Volume of Resin Regenerated Per Day

Resin Regeneration ($m^3$/day)=[10 MGD×3.785×25 mL/L×1000*5%]

Resin Regeneration ($m^3$/day)=47.3(=12,497 gal/day)

Brine/DOC Waste Volume Generated Per Day

Waste Volume ($m^3$/day)=47.3×0.2 BV

Waste Volume ($m^3$/day)=9.5(=2,510 gal/day=251 gal/MG)

For a conventional regeneration system, the expected waste volume figure is 414 gal/MG. This assumes the regenerant is discharged after ten uses.

Importantly, the present invention effectively does not generate a rinse water waste volume.

The present invention is also expected to reduce salt consumption. The regeneration system expected salt consumption may be in the range of 150 to 300 lb/MG.

In contrast, the conventional regeneration system, the expected salt consumption figure is 500 to 900 Ib/MG. This assumes ten (10) brine uses and excludes salt that could be recovered from brine treatment.

Example

Osmotic Shock Analysis

The use of highly concentrated or saturated brine solutions to regeneration ion-exchange resin is not recommended due to the physical damage that can be done to the resin by osmotic shock, which causes expansion, contraction or disintegration of the resin.

A 12% brine solution has been successfully used to regenerate MIEX® resin, when in service in water treatment plants. This concentration has been found to be safe, as it did not cause osmotic shock to the resin beads. However, replenishment of resin is still required on these plants due to losses by chemical and physical attrition and by losing intact beads over the settler.

A trial was conducted to determine if use of saturated brine in place of a 12% solution of brine would have any impact on resin strength or DOC removal efficacy. It was expected that the higher concentration of brine may cause the resin physical damage through osmotic shock. Surprisingly, no adverse affects on the resin were observed.

On average, a resin bead at the Wanneroo water treatment plant would expect to see around 600 regeneration cycles over its lifetime. For this reason it was decided to exceed this number during testing. Six hundred and sixty five (665) regeneration cycles were carried out.

In the study, a small volume of resin was contained within a column and subjected to 665 cycles between water, DOC bearing water, water, and brine solution. The resin was loaded with humic acid or dissolved organic carbon obtained from Wanneroo Water Treatment Plant. Efforts were made to maintain the resin in a fluidised state within the column whilst pumping the solutions through the column. To avoid blockage the flow of water through the column was periodically reversed. A saturated brine (~36% wt/wt) solution was used in place of the usual (12% wt/wt) concentration used in water treatment plants. Samples of DOC bearing water were taken during the study to measure the removal performance and additionally the resin was analysed at the end of experiment to see if any physical degradation had occurred.

Initially 50 mL of virgin resin was used. The flow rate of each solution through the column was 24 mL/min. A single cycle consisted of initial rinsing with tap water (9 minutes), DOC loading (15 minutes), rinsing with water (1 minute) and regenerating with saturated (~365 g/L) brine solution (20 minutes).

Where indicated the resin was subjected to an attrition test to simulate ordinary wear and tear during use in a water treatment plant. The particle size distribution (PSD) was measured using a Coulter L230 and the mean particle diameter was recorded. The resin (20 ml) was rinsed into a 250 ml PVC bottle and 10 g of glass beads (2-3 mm in diameter was added. The resin was mashed with the glass beads in the bottle for 60 minutes on a shaker table (speed was 1 Hz, average displacement was 6 cm) and analysed to measure the reduction in particle size.

Particle size distribution and microscopic observations were performed to determine resin attrition and to observe presence of apparent cracks/crazing on bead surfaces respectively. The information generated by particle size analysis for the virgin resin and cycled resin (including before and after attrition) are given in Tables 7a-7d below.

Tables 7a to 7d: Resin bead size distribution statistics of virgin resin after 665 regenerations of virgin resin including attrition results.

A. Virgin Resin

| Mean: | 234.4 μm | S.D.: | 125.4 μm | |
|---|---|---|---|---|
| Median: | 214.1 μm | | | |
| % < | 10 | 25 | 50 | 75 | 90 |
| μm | 115.3 | 160.5 | 214.1 | 278.9 | 358.7 |

B. Virgin Resin after 665 Regenerations (Cycled)

| Mean: | 229.7 μm | S.D.: | 117.6 μm | |
|---|---|---|---|---|
| Median: | 211.1 μm | | | |
| % < | 10 | 25 | 50 | 75 | 90 |
| μm | 116.9 | 159.6 | 211.1 | 273.6 | 347.8 |

C. Virgin Resin after Attrition

| Mean: | 162.0 μm | S.D.: | 101.1 μm | |
|---|---|---|---|---|
| Median: | 142.4 μm | | | |
| % < | 10 | 25 | 50 | 75 | 90 |
| μm | 47.26 | 88.50 | 142.4 | 213.7 | 307.1 |

D. Virgin Resin after Attrition and then 665 Regenerations (Cycled)

| Mean: | 155.6 μm | S.D.: | 107.5 μm | |
|---|---|---|---|---|
| Median: | 132.2 μm | | | |
| % < | 10 | 25 | 50 | 75 | 90 |
| μm | 39.67 | 78.49 | 132.2 | 208.3 | 304.8 |

In the above tables the following abbreviations were used

Mean relates to the mean particle sizes of the resin beads

S.D. Standard derivation

Figure 20:
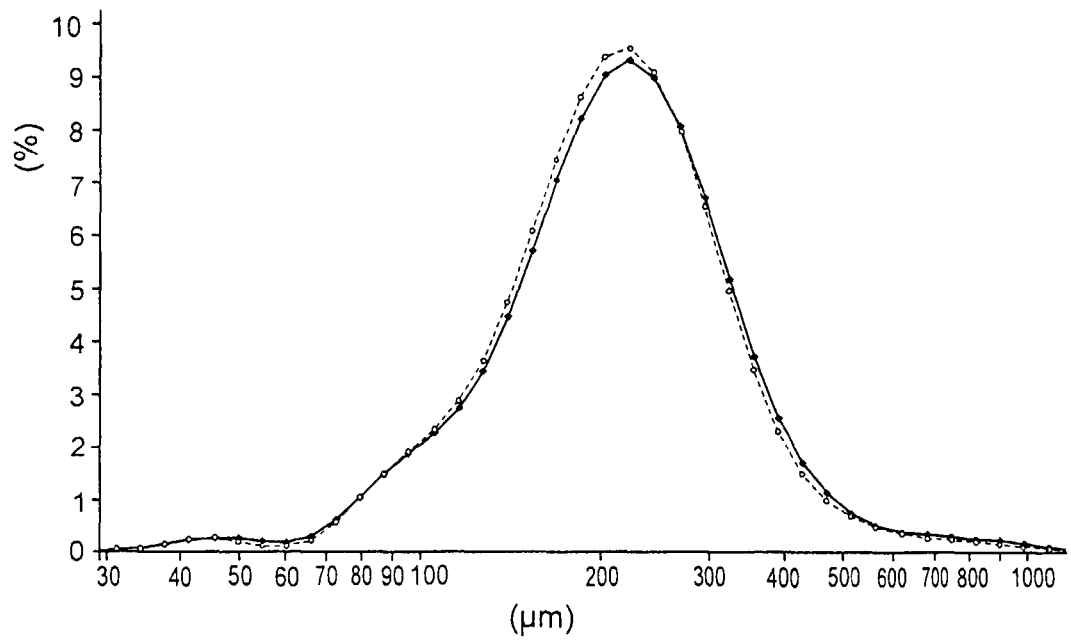
FIG. 20 is a graph of volume (%) and particle diameter (μm) of virgin resin (square, solid line) and virgin resin subjected to treatment cycles with saturated brine (circle, broken line).

The data showed that the physical morphology of the resin bead had not been changed by osmotic shock (compare Table 7a and b). The mean particle sizes and standard deviations of the virgin resin and cycled resin were 234, 230 μm and 125 and 118 μm respectively. FIG. 20 provides a comparison between the virgin resin and cycled virgin resin which was subjected to saturated brine.

Figure 21:
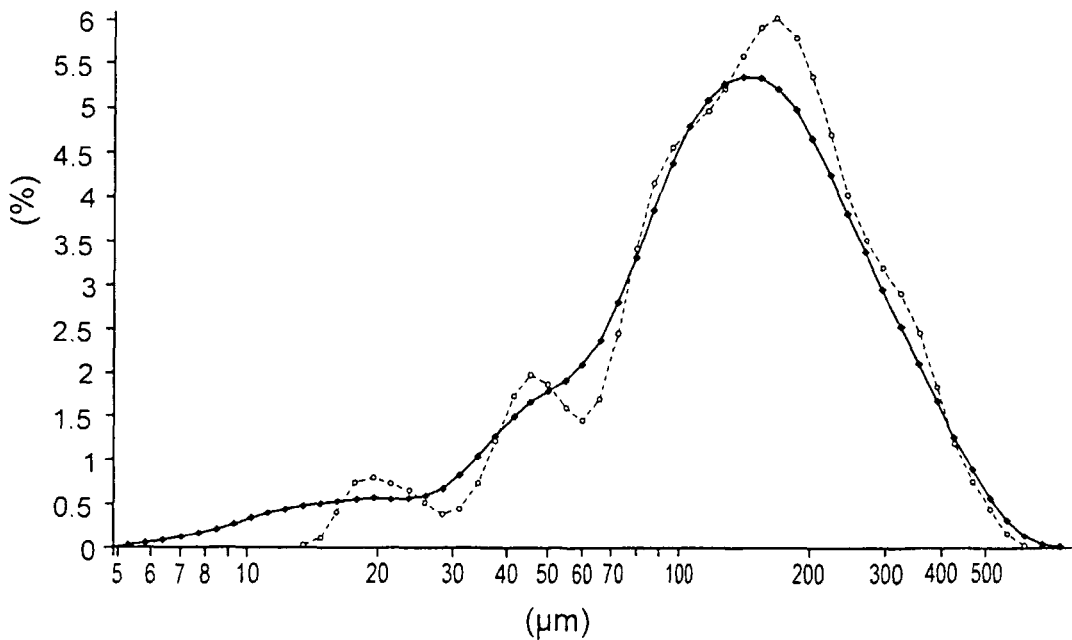
FIG. 21 is a graph of volume (%) and particle diameter (μm) after attrition of virgin resin (square, solid line) and virgin resin subjected to treatment cycles with saturated brine (circle, broken line).

FIG. 21 provides a comparison after attrition between virgin resin and cycled virgin resin which was subjected to saturated brine.

From the overlaying particle size distribution curves of virgin (indicated by solid line and squares plots) and cycled resin (indicated by broken line and circle plots) (FIG. 20), it is seen that the particle size distributions are very similar. However, there were differences in the particle size distributions after attrition of virgin (indicated by solid line and squares plots) and cycled resin (indicated by broken line and circle plots) (FIG. 21). The results do not suggest any reduction in the physical strength of cycled beads; rather it appeared to be comparable or slightly better than that observed for the virgin resin sample (see Tables 7c and d).

Figure 22A:
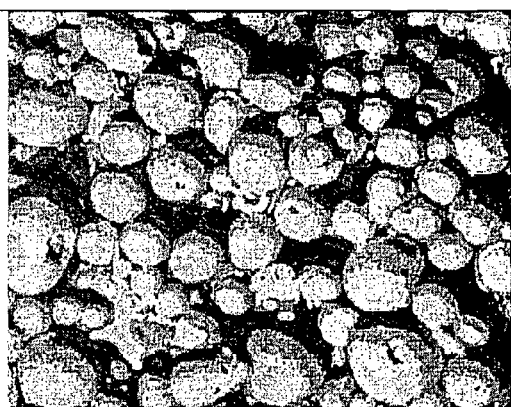
FIGS. 22a and 22b are a pair of photographs of samples of virgin resin.
Figure 22B:
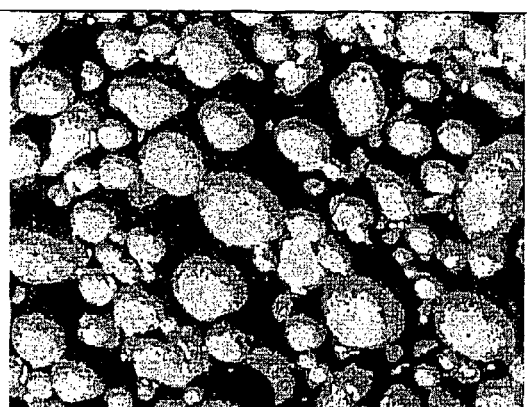
Figure 23A:
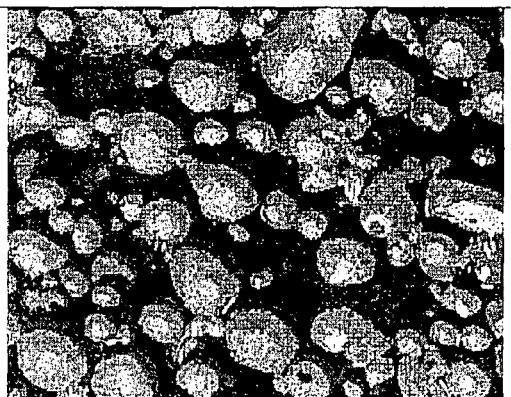
FIGS. 23a and 23b are a pair of photographs of samples of cycled virgin resin.
Figure 23B:
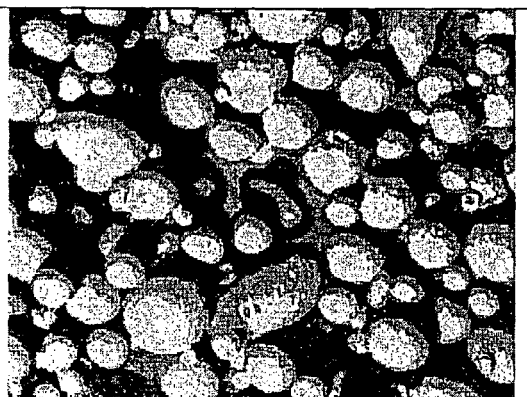

The results of the microscopic observations are shown in FIGS. 22 and 23. These figures depict a pair of photographs of the virgin resin (FIG. 22) and cycled resins (FIG. 23). In general, the shape of the resin varies from small to large and spherical to elongated types. Small cavities on the surface of beads can be seen in both cases. The surface morphology shown below did not indicate any difference between the samples. Also, observations did not reveal any increase in number of smaller sized resin beads.

When the cycled resin sample was removed from the column, a suspension was observed in the supernatant. The impurities were not attracted to a magnet on the side of a container but settled down slowly. The fine particles were not magnetically susceptible and as such are not thought to originate from the resin.

The cycled resin was examined under a microscopy and very fine non-resin particles with a few fine beads were observed. It is suspected that these impurities were introduced from the brine. It was also possible that this was emulsion polymer cleaned from the pores of the resin.

Both the virgin and cycled resin samples were subjected to the durability test. Disintegrated beads were found in both the virgin resin and cycled resin samples. The calculated decrease in mean particle sizes were 33.6% and 29.5% respectively, with the difference suggesting that the cycled resin may be slightly better, but the difference is not statistically significant. Microscope examination of the beads suggested that the beads were comparable. This suggests that osmotic shock has not impacted on the durability of the resin.

It was concluded that extended cycling of MIEX resin between tap water, DOC bearing water and saturated brine did not cause any reduction of physical strength of the resin beads. Furthermore, microscopic observation, particle size distribution analyse and attrition testing did not indicate that this cyclic exposure had any significant deleterious effects on the resin beads.

It follows that the use of brine, to regenerate the resin is not expected to affect the resin adversely irrespective of the concentration of brine used, so concentrated solutions of brine including saturated may be used in regeneration processes.

Those of ordinary skill in the art will appreciate that methods, materials (including pumping systems, resins and regenerants) and reactors other than those specifically described herein can be employed or adapted without undue experimentation to the practice of this invention. All such variants in methods, materials and reactors that are known in the art and can be so adapted or employed are encompassed by this invention. For example, although the invention has been described with an emphasis on water treatment processes, it will be appreciated that the process could also be used to regenerate resins used in non water based solvent systems such as organic solvents to improve colour, shelf life or recover acids, salts and metals. The invention may be used to regenerate resin systems used to remove undesirable ions from drinking water such as chromates and arsenics and recover those ions.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form or suggestion that that prior art forms part of the common general knowledge in Australia.

The invention claimed is:

1. A process for the regeneration of loaded ion-exchange resin comprising:
   (a) providing loaded resin for regeneration;
   (b) providing first stage and third stage regenerant suitable for regenerating loaded resin;
   (c) providing a plurality of regeneration vessels;
   (d) filling a regeneration vessel with a desired amount of the loaded resin before filling another regeneration vessel;
   (e) once a regeneration vessel has been filled, contacting the loaded resin within the vessel with first stage regenerant in a plug flow to provide a first stage regenerated resin;
   (f) contacting the first stage regenerated resin with third stage regenerant in a plug flow to provide regenerated resin;
   (g) removing and collecting third stage regenerant from a vessel containing regenerated resin and adding the collected regenerant to the first stage regenerant.

2. The process according to claim 1 wherein the vessel is filled with loaded resin in a transport fluid and any excess transport fluid is removed from the vessel before the first stage regenerant is added to the vessel.

3. The process according to claim 2 wherein the vessel, once filled with a desired amount of resin, contains a bed of resin in transport fluid and sufficient transport fluid is removed from the vessel to expose the top of the bed before the first stage regenerant is added to the vessel.

4. The process according to claim 1 wherein after step (e), the first stage regenerant is removed from the regeneration vessel and an initial portion of removed first stage regenerant is separated from the remainder of removed first stage regenerant.

5. The process according to claim 4 wherein the remainder of removed first stage regenerant is recycled as first stage regenerant for use in the regeneration process of loaded resin.

6. The process according to claim 4 wherein the separated initial portion of first stage regenerant is further processed to recover compounds that had been loaded on the resin and/or to recover the regenerant or is sent to waste.

7. The process according to claim 1 wherein a transport fluid is added to the vessel after the third stage regenerant and the third stage regenerant and a portion of the transport fluid are together collected as regenerant and added to the first stage regenerant.

8. The process according to claim 7 wherein, after step (e), the first stage regenerant is removed from the regeneration vessel and an initial portion of removed first stage regenerant is separated from the remainder of removed first stage regenerant and the remainder is recycled as first stage regenerant, and the amount of first stage regenerant removed in the regeneration process is balanced by the addition the collected third stage regenerant and the transport fluid to the first stage regenerant.

9. The process according to claim 1 wherein loaded resin for regeneration is stored in a loaded resin holding vessel before a regeneration vessel is filled with a desired amount of loaded resin.

10. The process according to claim 9 wherein there is a continuous flow of loaded resin in transport fluid flowing into the holding vessel.

11. The process according to claim 9 wherein the loaded resin is concentrated and the vessel is filled with a desired about of concentrated loaded resin at step (d).

12. The process according to claim 11 wherein the loaded resin is concentrated by transporting loaded resin in the transport fluid to a settler vessel and allowing transport fluid to overflow the settler vessel whilst loaded resin settles within the vessel to increase the concentration of the resin in the transport fluid within the vessel.

13. The process according to claim 12 wherein the settler vessel is the loaded resin holding vessel.

14. The process according to claim 12 wherein the regeneration process is used to regenerate resin obtained from a water treatment process and the transport fluid is water and the overflow of transport fluid and any non-settled resin suspended therein is returned to the water treatment process.

15. The process according to claim 1 wherein the regenerated resin is rinsed before the regenerated resin is removed from the vessel.

16. The process according to claim 15 wherein regenerated resin is rinsed by contact with a transport fluid suitable for inclusion in subsequent treatment processes requiring the resin.

17. The process according to claim 16 wherein the regenerated resin is for use in a water treatment process and water is used as the transport fluid to rinse the regenerated resin.

18. The process according to claim 1 wherein the resin for regeneration is loaded with dissolved organic carbon (DOC), perchlorate, sulfate, nitrate, phosphate, phosphite, bromide, bromate, arsenic, chromium or barium ions.

19. The process according to claim 1 wherein the first stage regenerated resin is subjected to a second stage regeneration by soaking in first stage regenerant before commencing step (f) of the regeneration processes.

20. The process according to claim 1 wherein one or more sensors are used to monitor the steps in the process and the sensors comprise one or more conductivity, volume and/or flow volume sensors.

21. The process according to claim 20 wherein conductivity sensors are used to determine when the third stage regenerant has been removed from the vessel.

22. The process according to claim 1 wherein the resin contains magnetic particles.

23. The process according to claim 22 wherein the resin is MIEX® resin.

24. The process according to claim 1 wherein the third stage regenerant is brine and has a concentration equal to or above 20% wt/wt.

25. The process according to claim 24 wherein the brine concentration is equal to or above 30% wt/wt.

26. The process according to claim 25 wherein the brine concentration is about 36% wt/wt.

27. The process according to claim 26 wherein the brine is a saturated brine solution.

28. The process according to claim 1 wherein the third stage regenerant is added to the vessel shortly before, during or shortly after commencing removal of the first stage regenerant from the vessel.

29. The process according to claim 1 wherein the first stage regenerant is added to the vessel shortly before or after completing removal of any excess transport fluid.

30. The process according to claim 1 comprising:
(a) providing loaded resin for regeneration in a holding vessel;
(b) providing first stage and third stage regenerant suitable for regenerating loaded resin;
(c) providing a plurality of regeneration vessels;
(d) providing a storage vessel for containing regenerated resin for use in subsequent ion-exchange processes;
(e) providing a continuous flow of loaded resin for regeneration in a transport fluid into the holding vessel;
(f) filling an empty regeneration vessel with a desired amount of loaded resin in transport fluid from the holding vessel before filling another empty regeneration vessel with a desired amount of loaded resin from the holding vessel;
(g) removing transport fluid from a filled regeneration vessel and contacting the loaded resin within the vessel with first stage regenerant in a plug flow to provide a first stage regenerated resin in first stage regenerant;
(h) removing first stage regenerant from a regeneration vessel containing first stage regenerated resin and contacting the resin therein with third stage regenerant in a plug flow to provide the regenerated resin;
(i) removing and collecting the third stage regenerant from a vessel containing regenerated resin and adding the collected regenerant to the first stage regenerant;
(j) rinsing the regenerated resin with a suitable transport fluid and transferring the rinsed resin into a storage vessel to provide regenerated resin in a transport fluid suitable for use in subsequent ion-exchange processes;
(k) repeating step (f) whenever there is an empty regeneration vessel and sufficient resin in the holding vessel.

31. The process according to claim 30 wherein after the vessel has been filled with loaded resin in the vessel in step (g), excess transport fluid is removed from the vessel before the first stage regenerant is added to the vessel.

32. The process according to claim 31 wherein the vessel, once filled with a desired amount of resin, contains a bed of resin in transport fluid and sufficient transport fluid is removed from the vessel to expose the top of the bed before the first stage regenerant is added to the vessel.

33. The process according to claim 32 wherein an initial portion of first stage regenerant removed in step (h) is not recycled and is separated from the remainder of the removed first stage regenerant.

34. The process according to claim 33 wherein the remainder of the first stage regenerant removed in step (h) is recycled as first stage regenerant.

35. The process according to claim 30 wherein a portion of the transport fluid used to rinse the resin at step (j) is collected and added with the collected third stage regenerant to the first stage regenerant.

36. The process according to claim 30 wherein an initial portion of the first stage regenerant removed at step (h) is separated from the remainder of the removed first stage regenerant and removed from the regeneration process, the remainder of the removed first stage regenerant is recycled as first stage regenerant, and loss of the initial portion from the regeneration process is balanced by the addition of the third stage regenerant and a portion of transport fluid used to rinse the regenerated resin to the first stage regenerant.

37. The process according to claim 30 wherein the first stage regenerated resin soaks in first stage regenerant before commencing step (h).

38. The process according to claim 30 wherein the loaded resin is concentrated before a regeneration vessel is filled with the concentrated loaded resin.

39. The process according to claim 38 wherein the loaded resin is concentrated by transporting loaded resin in a transport fluid to a settler vessel and allowing transport fluid to overflow the settler vessel whilst loaded resin settles within the vessel to increase the concentration of the resin in the transport fluid within the vessel.

40. The process according to claim 39 wherein the holding vessel operates as a settler vessel.

41. The process according to claim 30 wherein the regeneration process is used to regenerate resin obtained from a water treatment process and the transport fluid is water and the overflow of transport fluid and any resin suspended therein is returned to a water treatment process.

42. The process according to claim 30 wherein the resin contains magnetic particles.

43. A process for the removal of ions from water containing the ions comprising:
(i) contacting the water with a suitable ion exchange resin to enable adsorption of ion on the resin;
(ii) separating at least a portion of the resin loaded with the ions from the water; and
(iii) regenerating at least some of the separated resin, wherein the resin is regenerated by the regeneration process according to claim 1.

44. The process according to claim 43 comprising the additional step of:—
(iv) returning the regenerated resin back to step (i).

45. The process according to claim 43 for the removal of DOC from water.

46. A process for the regeneration of loaded ion-exchange resin comprising:
(a) providing loaded resin for regeneration;
(b) providing first and third stage regenerant suitable for regenerating loaded resin;
(c) providing a plurality of first stage regeneration vessels;
(d) providing a plurality of third stage vessels;
(e) filling a first stage regeneration vessel with a desired amount of the loaded resin before filling another first stage regeneration vessel;
(f) once a first stage regeneration vessel has been filled, contacting the loaded resin within the vessel with first stage regenerant in a plug flow to provide a first stage regenerated resin;
(g) transferring the first stage regenerated resin from a first stage regeneration vessel into a third stage vessel;
(h) contacting the first stage regenerated resin in the third stage vessel with third stage regenerant in a plug flow to provide the regenerated resin;
wherein after contacting the resin in step (h), the third stage regenerant is collected and added to the first stage regenerant.

47. A process for the regeneration of loaded ion-exchange resin comprising:
(a) providing loaded resin for regeneration;
(b) providing first stage and third stage regenerant suitable for regenerating loaded resin;
(c) providing a plurality of first stage regeneration vessels;
(d) providing at least one second stage regeneration vessel;
(e) providing a plurality of third stage vessels;
(f) filling a first stage regeneration vessel with a desired amount of the loaded resin before filling another first stage regeneration vessel;
(g) once a first stage regeneration vessel has been filled, contacting the loaded resin within the vessel with first stage regenerant in a plug flow to provide a first stage regenerated resin;
(h) transferring the first stage regenerated resin from first stage regeneration vessels into the second stage regeneration vessel and soaking the resin in first stage regenerant to provide second stage regenerated resin;
(i) filling a third stage vessel with a desired amount of the second stage regenerated resin before filling another third stage vessel;

(j) once a third stage regeneration vessel has been filled, contacting the second stage regenerated resin therein with third stage regenerant in a plug flow to provide the regenerated resin;

wherein after contacting the resin in step (j), the third stage regenerant is collected and added to the first stage regenerant.

48. A process for the regeneration of loaded ion-exchange resin comprising:
  (a) providing first and third stage regenerant suitable for regenerating loaded resin;
  (b) providing a plurality of first stage regeneration vessels;
  (c) providing a second stage regeneration vessel;
  (d) providing a plurality of third stage vessels;
  (e) providing a first stage concentrator vessel;
  (f) providing a third stage concentrator vessel;
  (g) providing a storage vessel for containing regenerated resin in a transport fluid suitable for use in subsequent ion-exchange processes;
  (h) providing a continuous flow of loaded resin for regeneration in a transport fluid into the first stage concentrator vessel and increasing the concentration of the resin within the transport fluid by allowing excess transport fluid to overflow the concentrator;
  (i) filling an empty first stage regeneration vessel with a desired amount of concentrated loaded resin in transport fluid from the first stage concentrator before filling another empty first stage regeneration vessel with a desired amount of concentrated loaded resin from the concentrator;
  (j) removing transport fluid from a filled first stage regeneration vessel and contacting the loaded resin within the vessel with first stage regenerant in a plug flow to provide a first stage regenerated resin in regenerant;
  (k) transporting all first stage regenerated resin from first stage regeneration vessels into a second stage regeneration vessel and soaking the resin in first stage regenerant to provide second stage regenerated resin;
  (l) providing a continuous flow of second stage regenerated resin from the second stage regeneration vessel into the third stage concentrator vessel and increasing the concentration of the resin by allowing excess first stage regenerant to overflow the concentrator;
  (m) filling an empty third stage vessel with a desired amount of the concentrated second stage regenerated resin in first stage regenerant from the third stage concentrator before filling another empty third stage vessel with a desired amount of concentrated second stage regenerated resin from the third stage concentrator;
  (n) removing first stage regenerant from a filled third stage vessel and contacting the resin therein with third stage regenerant in a plug flow to provide the regenerated resin;
  (o) rinsing the regenerated resin in a third stage vessel with a suitable transport fluid and transferring the rinsed resin into a storage vessel to provide regenerated resin in a transport fluid suitable for use in subsequent ion-exchange processes;
  (p) removing and collecting third stage regenerant from a third stage vessel containing regenerated resin and adding the collected regenerant to the first stage regenerant;
  (q) collecting the excess first stage regenerant from the step (l) and returning it to first stage regenerant;
  (r) repeating step (i) whenever there is an empty first stage regeneration vessel and sufficient resin to fill the vessel in the first stage concentrator;
  (s) repeating step (m) whenever there is an empty third stage vessel and sufficient resin to fill the vessel in the third stage concentrator.

49. The process according to claim 46 wherein any excess transport fluid with the resin is removed before the first stage regenerant is added to the vessel.

50. The process according to claim 46 wherein the first stage regenerant is removed from the vessel after contact with the resin and an initial portion of the removed regenerant is separated from the remainder and the remainder is recycled as first stage regenerant.

51. The process according to claim 50 wherein the separated portion of the removed regenerant is further processed to recover compounds that had been loaded on the resin and/or to recover the regenerant, or is sent to waste.

52. The process according to claim 50 wherein the loss of the separated portion of first stage regenerant from the first stage regenerant is balanced by the addition of the third stage regenerant collected after contact with the first stage regenerated resin.

53. The process according to claim 52 wherein the third stage regenerant is collected with a portion of transport fluid applied to the regenerated resin to rinse the resin.

54. The process according to any one of claim 46 comprising the additional step of concentrating the loaded resin before filling a first stage vessel with the loaded resin.

55. The process according to claim 47 comprising the additional step of concentrating the second stage regenerated resin before filling a third stage vessel with the resin.

56. The process according to claim 54 wherein a settling vessel is used to concentrate the resin.

57. The process according to claim 48 wherein the resin the transport fluid in step (h) is water from a water treatment plant.

58. The process according to claim 53 wherein the transport fluid is water from a water treatment plant.

59. The process according to claim 58 wherein the transport fluid overflowing the first stage concentrator vessel and also the transport fluid removed at step (j) is returned to the treatment plant.

60. The process according to claim 59 wherein the fluid removed at step (j) is returned to the water treatment plant until a sensor detects that first stage regenerant is removed from the first stage regeneration vessels.

61. The process according to claim 60 wherein a conductivity sensor is used to determine when first stage regenerant is removed from the vessel.

62. The process according to claim 46 wherein the resin contains magnetic particles.

63. A process for the removal of ions from water containing the ions comprising:
  (i) contacting the water with a suitable ion exchange resin to enable adsorption of ion on the resin;
  (ii) separating at least a portion of the resin loaded with the ions from the water; and
  (iii) regenerating at least some of the separated resin, wherein the resin is regenerated by the regeneration process according to claim 46.

64. The process according to claim 63 comprising the additional step of:—
  (iv) returning the regenerated resin back to step (i).

65. The process according to claim 63 for the removal of DOC from water.

* * * * *